US012737440B2

(12) United States Patent
Wright et al.

(10) Patent No.: US 12,737,440 B2
(45) Date of Patent: Sep. 15, 2026

(54) BIOMETRIC AUTHENTICATION THROUGH VASCULAR STUDIES

(71) Applicant: JVCKENWOOD Corporation, Yokohama (JP)

(72) Inventors: Christopher John Wright, London (GB); David Michael Duffy, Zurich (CH); Harry Michael Cronin, Cambridge (GB)

(73) Assignee: JVCKenwood Corporation, Yokohama (JP)

(*) Notice: Subject to any disclaimer, the term of this patent is extended or adjusted under 35 U.S.C. 154(b) by 308 days.

(21) Appl. No.: 18/643,896

(22) Filed: Apr. 23, 2024

(65) Prior Publication Data

US 2024/0273175 A1 Aug. 15, 2024

Related U.S. Application Data

(63) Continuation of application No. 17/459,289, filed on Aug. 27, 2021, now Pat. No. 11,995,166.

(Continued)

(51) Int. Cl.

*G06N 20/00* (2019.01)
*G06F 21/32* (2013.01)

(Continued)

(52) U.S. Cl.

CPC ............... *G06F 21/32* (2013.01); *G06N 3/08* (2013.01); *G06V 40/10* (2022.01);

(Continued)

(58) Field of Classification Search

CPC .. G06F 21/32; G06V 40/145; G06V 40/1365; G06V 40/172; G06V 40/10; G06V 40/14; G06V 40/1341; G06V 40/15; G06N 3/08

See application file for complete search history.

(56) References Cited

U.S. PATENT DOCUMENTS 10,135,822 B2 11/2018 Adams
10,181,021 B2 1/2019 Venkatraman et al.

(Continued)

FOREIGN PATENT DOCUMENTS

CN 105992129 A 10/2016
CN 110210394 A 9/2019

(Continued)

OTHER PUBLICATIONS

"International Search Report and Written Opinion" mailed on Jun. 30, 2022 for PCT Application No. PCT/JP2021/046273, 17 pages.

(Continued)

*Primary Examiner* — Syed Haider

(74) *Attorney, Agent, or Firm* — Perkins Coie LLP; Andrew T. Pettit

(57) ABSTRACT

Introduced here are approaches to authenticating unknown persons based on variations in the spatial properties and directionality of blood flow through vessels over time. At a high level, these approaches rely on monitoring vascular dynamics to recognize unknown persons. For example, an authentication platform may examine digital images of an anatomical region to establish how a property of the vasculature within the anatomical region changed as a result of deformation. Examples of properties include the position, size, volume, and pressure of vessels included in the vasculature, as well as the velocity and acceleration of blood flowing through the vasculature.

8 Claims, 11 Drawing Sheets

Related U.S. Application Data

(60) Provisional application No. 63/127,054, filed on Dec. 17, 2020.

(51) Int. Cl.
*G06N 3/08* (2023.01)
*G06V 40/10* (2022.01)
*G06V 40/12* (2022.01)
*G06V 40/145* (2022.01)
*G06V 40/16* (2022.01)
*G06V 40/14* (2022.01)

(52) U.S. Cl.
CPC ........ *G06V 40/1365* (2022.01); *G06V 40/145* (2022.01); *G06V 40/172* (2022.01); *G06V 40/1341* (2022.01); *G06V 40/14* (2022.01); *G06V 40/15* (2022.01)

(56) References Cited

U.S. PATENT DOCUMENTS

| | | | | |
|---|---|---|---|---|
| 10,547,611 | B2 | 1/2020 | Adams | |
| 10,721,228 | B2 | 7/2020 | Adams | |
| 10,880,303 | B2 | 12/2020 | Adams et al. | |
| 11,277,405 | B2 | 3/2022 | Adams et al. | |
| 11,368,455 | B2 | 6/2022 | Adams | |
| 11,374,929 | B2 | 6/2022 | Adams et al. | |
| 2006/0094937 | A1 | 5/2006 | Immoreev et al. | |
| 2007/0116330 | A1* | 5/2007 | Takiguchi | G06V 40/1347 382/115 |
| 2010/0074476 | A1 | 3/2010 | Aoki et al. | |
| 2012/0230555 | A1* | 9/2012 | Miura | G06V 30/242 382/124 |
| 2014/0196131 | A1 | 7/2014 | Lee | |
| 2015/0112159 | A1 | 4/2015 | He et al. | |
| 2015/0143496 | A1 | 5/2015 | Thomas et al. | |
| 2015/0304322 | A1* | 10/2015 | Zaidi | G06V 40/70 382/115 |
| 2016/0117563 | A1* | 4/2016 | Shin | G06V 40/10 382/115 |
| 2017/0124370 | A1 | 5/2017 | He et al. | |
| 2017/0161577 | A1 | 6/2017 | Lee et al. | |
| 2017/0287325 | A1 | 10/2017 | Filatova et al. | |
| 2018/0052983 | A1 | 2/2018 | Stolbikov et al. | |
| 2019/0095681 | A1 | 3/2019 | Lee et al. | |
| 2019/0190909 | A1* | 6/2019 | Adams, Jr. | G06F 16/955 |
| 2019/0207932 | A1 | 7/2019 | Bud et al. | |
| 2019/0370527 | A1* | 12/2019 | Lee | G06V 40/1312 |
| 2020/0065569 | A1* | 2/2020 | Nduka | G06V 40/70 |
| 2020/0077892 | A1 | 3/2020 | Tran | |
| 2020/0196879 | A1 | 6/2020 | Ariyama et al. | |
| 2020/0272717 | A1* | 8/2020 | Figueredo de Santana | G06V 40/172 |
| 2020/0327302 | A1 | 10/2020 | He et al. | |
| 2020/0358762 | A1* | 11/2020 | Adams, Jr. | G06V 40/70 |

FOREIGN PATENT DOCUMENTS

| | | | |
|---|---|---|---|
| KR | 20200041480 | A | 4/2020 |
| WO | 2018175494 | A1 | 9/2018 |
| WO | 2021095903 | A1 | 5/2021 |

OTHER PUBLICATIONS

Buddharaju, Pradeep, et al., "Physiology-Based Face Recognition in the Thermal Infrared Spectrum", IEEE Transactions on Pattern Analysis and Machine Intelligence, IEEE Computer Society, USA, vol. 29, No. 4, Apr. 1, 2007 (Apr. 1, 2007), pp. 613-626.

Jimenez, Jorge , et al.,"A practical appearance model for dynamic facial color", ACM SIGGRAPH Asia 2010 Papers On, SIGGRAPH Asia '10,Jan. 1, 2010 (Jan. 1, 2010), 1 page.

Shang, Jiacheng , et al., "A Usable Authentication System Using Wrist-Worn Photoplethysmography Sensors on Smartwatches", 2019 IEEE Conference On Communications and Network Security (CNS), IEEE, Jun. 10, 2019 (Jun. 10, 2019), p. 1-9., 9 pages.

* cited by examiner

Measured Flow Pattern
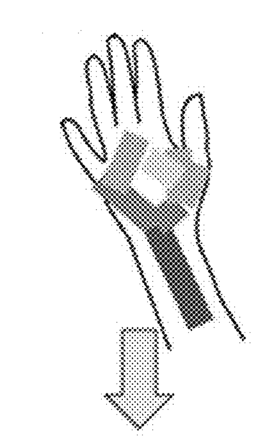
Known Vein Map
Known Deformed Vein Map
Predicted Deformed Flow Pattern
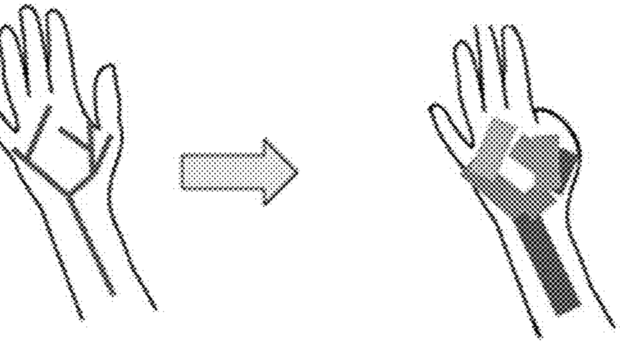
Measured Deformed Flow Pattern
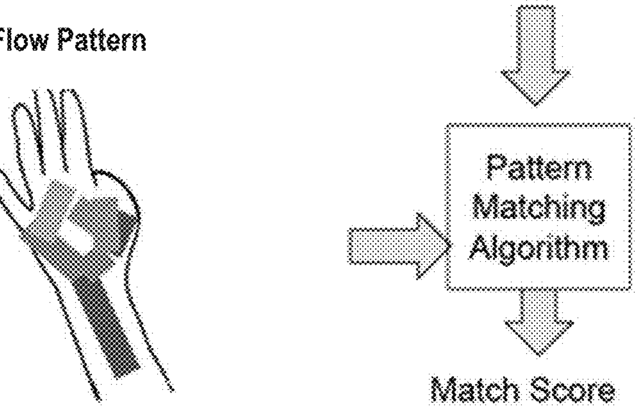
FIGURE 10

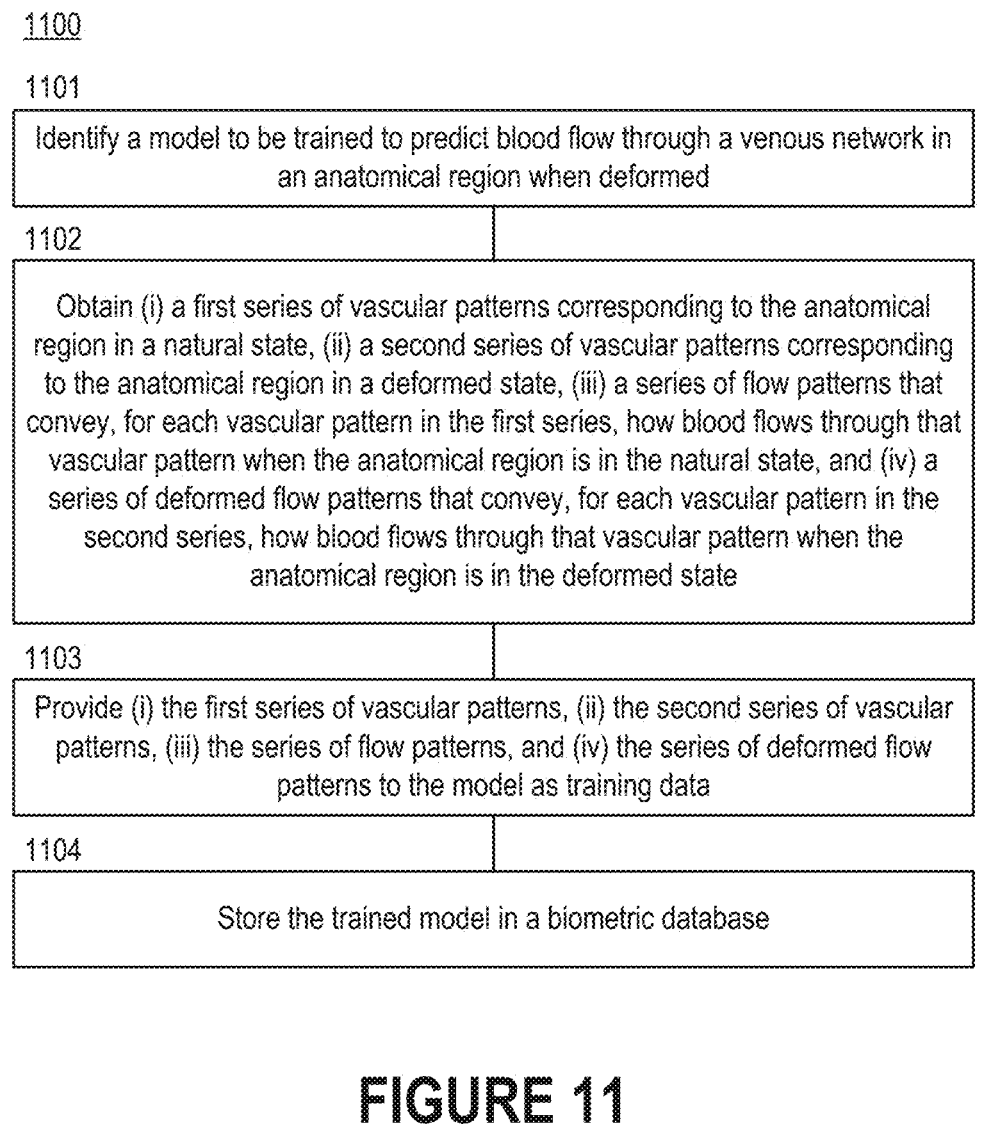

1100

1101

Identify a model to be trained to predict blood flow through a venous network in an anatomical region when deformed

1102

Obtain (i) a first series of vascular patterns corresponding to the anatomical region in a natural state, (ii) a second series of vascular patterns corresponding to the anatomical region in a deformed state, (iii) a series of flow patterns that convey, for each vascular pattern in the first series, how blood flows through that vascular pattern when the anatomical region is in the natural state, and (iv) a series of deformed flow patterns that convey, for each vascular pattern in the second series, how blood flows through that vascular pattern when the anatomical region is in the deformed state

1103

Provide (i) the first series of vascular patterns, (ii) the second series of vascular patterns, (iii) the series of flow patterns, and (iv) the series of deformed flow patterns to the model as training data

1104

Store the trained model in a biometric database

FIGURE 11

BIOMETRIC AUTHENTICATION THROUGH VASCULAR STUDIES

CROSS-REFERENCE TO RELATED APPLICATIONS

This application is a continuation of U.S. application Ser. No. 17/459,289, titled "Biometric Authentication Through Vascular Studies" and filed Aug. 27, 2021, which claims priority to U.S. Provisional Application No. 63/127,054, titled "Vein Map Authentication with Image Sensor" and filed on Dec. 17, 2020, each of which is incorporated by reference herein in its entirety.

TECHNICAL FIELD

The present disclosure pertains to biometric authentication in computer security and, more specifically, to techniques in which physiological characteristics are examined to allow for minimally disruptive authentication.

BACKGROUND

Biometric authentication procedures verify the identity of an individual through biometrics. The term "biometric" refers to a physical or behavioral characteristic that can be used as a means of verifying identity. Biometrics are difficult to spoof and convenient since the corresponding individuals do not have to remember passwords or manage tokens. Instead, the authentication mechanism is part of the individual.

Fingerprints have historically been the most common biometric modality. However, other biometric modalities have emerged as technologies have evolved. As an example, vascular pattern recognition (also referred to as "vein pattern recognition") uses near-infrared light to create images of subcutaneous blood vessels (or simply "vessels"). These subcutaneous vessels collectively define a "vascular pattern" or "vein map" that can be used for authentication. Vein pattern authentication has shown promise as a vascular pattern will not only be unique to the corresponding individual but will also experience minimal change as that individual ages.

Vein pattern authentication normally involves identifying and then analyzing the vascular pattern along the backside of the hand. For instance, near-infrared light generated by light-emitting diodes (LEDs) may be emitted toward the backside of the hand so that it penetrates the skin. Due to the difference in absorbance of vessels and other tissues, the near-infrared light will be reflected towards the skin at different depths. The vascular pattern may be inferred based on an analysis of the reflected near-infrared light, and from the vascular pattern, features such as branching locations and angles can be determined (and then used for authentication).

Vein pattern authentication has been touted as a contactless option for biometric authentication that is relatively immune to forgery since vascular patterns are difficult to recreate. Moreover, vein pattern authentication has significant advances over other approaches to biometric authentication in terms of false acceptance rate (also referred to as "false positive rate") and false rejection rate (also referred to as "false negative rate"). There are several downsides to vein pattern authentication, however. For example, individuals tend to be uncomfortable exposing their bodies to the unfamiliar sources of light that normally accompany the scanning equipment necessary for vein pattern authentication. Also, this scanning equipment can also be difficult—if not impossible—to deploy in some environments, as well as prohibitively expensive for many merchants.

BRIEF DESCRIPTION OF THE DRAWINGS

FIG. 10 includes a visual illustration of the process by which an authentication platform determines whether to authenticate an unknown person as a given individual.

FIG. 11 includes a flow diagram of a process for creating a model that is trained to predict the flow of blood through the vasculature of an anatomical region when deformed.

Figure 1:
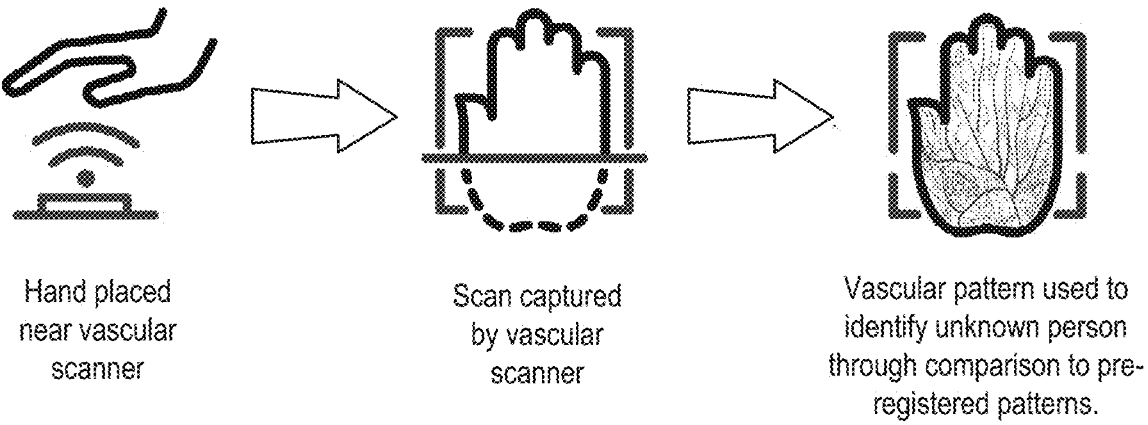
FIG. 1 includes a high-level illustration of a conventional authentication procedure in which an unknown person is prompted to present a hand to a vascular scanner.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

To enroll in an authentication program that relies on matching vein patterns, an individual (also referred to as a "user") may initially be prompted to present a hand to a vascular scanner. The term "vascular scanner" may be used to refer to an imaging instrument that includes (i) an emitter operable to emit electromagnetic radiation (e.g., in the near infrared range) into the body and (ii) a sensor operable to sense electromagnetic radiation reflected by physiological structures inside the body. Normally, a digital image is created based on the reflected electromagnetic radiation that serves as a reference template. At a high level, the reference template is representative of a "ground truth" vascular pattern that can be used for authentication.

FIG. 1 includes a high-level illustration of a conventional authentication procedure in which an unknown person is prompted to present a hand to a vascular scanner. As shown in FIG. 1, the vascular scanner will emit electromagnetic radiation into the hand and then create a digital image (also referred to as a "scan") based on the electromagnetic radiation as reflected by the vessels in the hand. This image is indicative of the vascular pattern of the hand, and thus can be verified against a reference template created for a given individual during an enrollment phase (also referred to as a "registration phase"). If the digital image matches the reference template, then the unknown person will be authenticated as the given individual. However, if the digital image does not match the reference template, then the unknown person will not be authenticated as the given individual.

Vein pattern matching has become an attractive option for biometric authentication since vascular scanners do not require direct contact with the body while scanning is performed. Vein pattern matching has been shown to be susceptible to spoofing, however. As an example, Jan Krissler and Julian Albrecht demonstrated how vascular scanners could be bypassed using a fake hand made of wax at the Chaos Communication Congress in 2018. While spoofing is unlikely to be successful in most real-world conditions, any concerns related to vulnerabilities may impede adoption of a reliable technique of biometric authentication.

Introduced here, therefore, are approaches to authenticating unknown persons based on variations in the spatial properties and directionality of blood flow through the vessels over time. At a high level, these approaches rely on monitoring vascular dynamics to recognize unknown persons. The term "vascular dynamics" refer to the changes in the vasculature and its properties that are caused by deformation of the surrounding subcutaneous tissue, for example, due to performance of a gesture. Examples of vascular properties include the position, size, volume, and pressure of a vessel, as well as the velocity and acceleration of blood flowing through the vessel.

Figure 2:
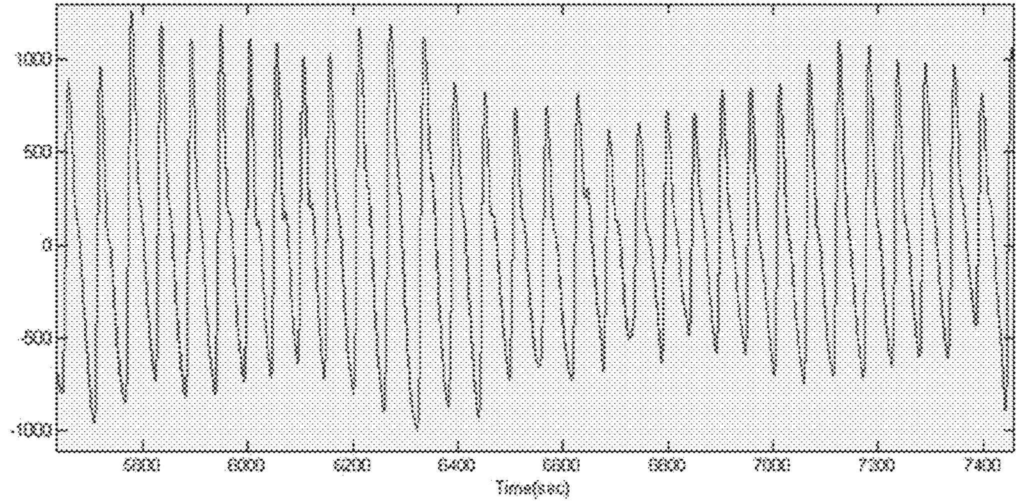
FIG. 2 illustrates how, in a photoplethysmogram, each cardiac cycle is shown as a peak.

As further discussed below, these approaches to authentication can be viewed as a form of ranged photoplethysmogram (PPG) monitoring. The term "photoplethysmogram" refers to an optically obtained plethysmogram that can be used to detect changes in the volume of blood in subcutaneous tissue. With each cardiac cycle, the heart pumps blood to the periphery of the body. While this pressure pulse is somewhat dampened by the time the blood reaches the skin, it is enough to distend the vessels in the subcutaneous tissue to a detectable degree. Changes in volume caused by pressure pulses can be detected by illuminating the skin and then measuring the amount of light that is transmitted or reflected to an image sensor. In a PPG, each cardiac cycle appears as a peak as shown in FIG. 2.

Historically, pulse oximeters were commonly used for PPG monitoring. A pulse oximeter normally includes at least one light-emitting diode (LED) that emits light toward a photodiode through a part of the body, such as a fingertip or earlobe. However, PPGs could also be obtained through analysis of digital images of an anatomical region of interest. In such a scenario, pressure pulses may be evidenced by subtle changes in the color of the skin and subcutaneous tissue. Nuanced characteristics of pressure pulses may be difficult to establish though. For example, the timing and phase of pressure pulses can be difficult to discover through analysis of digital images of the face due to the complex structure of the underlying vasculature and complex impact of body posture and facial expression. Deformation of subcutaneous tissue caused by body posture and facial expression affects resistance to blood flowing through the venous network in the face, which would in turn affect the signal generated by an image sensor that observes subcutaneous tissue innervated by the venous network. While the relationship between deformation of the subcutaneous tissue and the signal generated by the image sensor is difficult to quantify, deformation has a predictable effect on the signal (and thus can be used as a means of authentication).

In order to determine whether to authenticate an unknown person as a given individual, an authentication platform (also referred to as an "authentication system") may determine the degree to which the vascular dynamics of the unknown person compare to the vascular dynamics of the given individual. Assume, for example, that an unknown person wishes to authenticate herself as a given individual. In such a scenario, the unknown person may be prompted to perform a gesture that causes deformation of the subcutaneous tissue (and thus, the vasculature) in an anatomical region. This gesture may be related to the anatomical region. For example, the unknown person may be prompted to smile or frown if the authentication platform is to examine vascular dynamics of the face, and the unknown person may be prompted to clench her hand if the authentication platform is to examine vascular dynamics of the hand.

While the unknown person performs the gesture, a camera of an electronic device may generate digital images of the anatomical region. For example, the camera may generate digital images in rapid succession at a predetermined cadence. As another example, the camera may generate a video of the anatomical region, in which case the digital images may be representative of the frames of the video. Based on an analysis of the digital images, the authentication platform may generate a "biometric signature" or "vascular signature" for the unknown perform. For example, the authentication platform may produce a venous model that programmatically indicates how the vasculature deformed while the gesture was performed. At a high level, the venous model specifies how the spatial properties of the vasculature varied as a result of the gesture. Alternatively, the authentication platform may estimate a metric for a vascular property based on an analysis of the digital images. For example, the authentication platform may attempt to quantify how directionality of the flow of blood through the vasculature varied as a result of the gesture.

The authentication platform can then compare the biometric signature against a registered biometric signature (also referred to as a "reference biometric signature") that is associated with the given individual in order to determine whether the unknown person should be authenticated as the given individual. For example, if the authentication platform produces a venous model that programmatically indicates how the vasculature of the unknown person deformed as the gesture was performed, then the authentication platform may (i) obtain a vein map associated with the given individual and (ii) estimate the deformation that would be expected during performance of the gesture by the given individual based on the vein map. As another example, if the authentication platform estimates a metric that indicates how a vascular property varied while the gesture was performed, then the authentication platform may (i) obtain a vein map associated with the given individual and (ii) estimate the metric that would be expected during performance of the gesture by the given individual based on the vein map. As further discussed below, the vein map may be stored in a digital profile that contains information regarding the vasculature of the given individual. For example, the digital profile may include vein maps for different anatomical regions, metrics for different vascular properties, and the like.

In sum, the authentication platform may cause presentation of a notification that instructs a person to be authenticated to perform a gesture that causes deformation of an anatomical region, acquire digital images of the anatomical region that are generated by an electronic device as the person performs the gesture, estimate, based on the digital images, a characteristic of blood flow through subcutaneous vessels in the anatomical region, and then determine whether to authenticate the person as a given individual based on a comparison of the estimated characteristic to a digital profile that is associated with the given individual. The estimated characteristic could be, for example, the directionality, speed, volume, phase, or pressure of blood flowing through the subcutaneous vessels.

Authentication based on biometric signatures offers many of the same benefits as vein pattern matching, namely, high accuracy, reliability, and consistency since the information being "read" is inside the body. However, the approaches are easier to implement since specialized equipment (e.g., vascular scanners) are not needed. Instead, authentication can be performed based on analysis of digital images generated by an electronic device. While the electronic device could include specialized software, firmware, or hardware, commodity standardized hardware (e.g., the digital image sensors used in mobile phones, tablet computers, etc.) may be sufficient for capturing digital images of high quality.

At a high level, the authentication platform is designed to facilitate an approach whereby an individual is able to link vein maps that serve as authentication factors to measured blood flow that serve as PPG signals. As such, authentication may be achieved using electronic devices that are not capable of detecting individual vessels but are capable of detecting spatially resolved PPG signals (e.g., through analysis of digital images). Specifically, the approaches described herein (i) enable high-security authentication without requiring specialized equipment, (ii) permit authentication based on a knowledge factor (e.g., of the deformation) and biometric information of the unknown person and given individual, and (iii) allow for authentication that is robust to spoofing and theft, as new deformations can be readily identified and requested.

For the purpose of illustration, embodiments may be described in the context of monitoring the vasculature in a given anatomical region. For example, embodiments may be described in the context of examining digital images of the face, palm, or finger. However, the approaches described herein may be similarly applicable to the vasculature in other parts of the human body.

While not required, implementations are described below in the context of instructions that are executable by an electronic device. The term "electronic device" is generally used interchangeably with the term "computing device," and thus may be used to refer to computer servers, point-of-sale (POS) systems, tablet computers, wearable devices (e.g., fitness trackers and watches), mobile phones, and the like.

While aspects of the technology, such as certain modules, may be described as being performed exclusively or primarily by a single electronic device, some implementations are practiced in distributed environments where modules are shared among multiple electronic devices that are linked through a network. For example, an unknown person may be asked to initiate an authentication procedure by a mobile phone that generates digital images of an anatomical region, though the decision on whether to authenticate the unknown person may be made by an authentication platform that resides on a computer server to which the mobile phone transmits the digital images.

Terminology

References in this description to "an embodiment" or "one embodiment" means that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," and variants thereof are intended to include any connection or coupling between two or more elements, either direct or indirect. The connection/coupling can be physical, logical, or a combination thereof. For example, objects may be electrically or communicatively coupled to one another despite not sharing a physical connection.

The term "module" may refer to software components, firmware components, or hardware components. Modules are typically functional components that generate one or more outputs based on one or more inputs. As an example, a computer program may include multiple modules responsible for completing different tasks or a single module responsible for completing all tasks.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open ended.

Authentication Through Analysis of Vascular Information

Introduced here are authentication platforms that use vascular dynamics as biometric proof that an unknown person is a given individual. As further discussed below, the spatial properties and directionality of blood flow through the vessels in an anatomical region can be estimated based on an analysis of one or more digital images of the anatomical region. The spatial properties and directionality of blood flow will vary as the surrounding subcutaneous tissues deform (e.g., due to performance of a gesture), and those variations can be used to determine whether to authenticate the unknown person as the given individual.

An authentication platform can be used to secure biometric-driven transactions such as payments authorized through hands-free interfaces. Assume, for example, that an unknown person wishes to authenticate herself in order to complete a transaction. Rather than prompt the unknown person to locate a body part (e.g., her hand) near a vascular scanner, biometric authentication could instead be performed using the electronic device that the unknown person used to initiate the transaction. For example, if the unknown person initiates a transaction using a mobile phone in her possession, the mobile phone may generate digital images of an anatomical region (e.g., the face) that can be analyzed by the authentication platform. As further discussed below, the authentication platform may reside on the mobile phone or another electronic device (e.g., a computer server) to which the mobile phone is communicatively connected. While this approach to authentication relies on analysis of vessels beneath the skin, the mobile phone does not need to contact the skin. Instead, the unknown person may simply be prompted to generate digital images of an anatomical region for authentication purposes using the mobile phone. As such, the authentication platform may permit persons to authenticate themselves in a minimally disruptive manner by relying on information regarding vascular dynamics.

In some embodiments the authentication platform operates independently to authenticate the identity of unknown persons, while in other embodiments the authentication platform operates in conjunction with another system. For instance, a payment system may interface with an authentication platform to ensure that transactions are completed in a secure, hassle-free manner. As an example, the authentication platform may facilitate a non-contact payment procedure in which an unknown person is permitted to initiate or complete a transaction by making a body part available for imaging. As mentioned above, the unknown person may make the body part available for imaging by simply locating the body part within the field of view of a camera of an electronic device. While the electronic device is normally the one used to initiate or complete the transaction, that need not necessarily be the case.

Note that while embodiments may discuss authentication in the context of initiating or completing transactions, authentication can be useful in various context. Assume, for example, that a series of individuals have been invited to a network-accessible meeting in which sensitive information is to be shared. Each person who attempts to enter the network-accessible meeting may need to be authenticated by the authentication platform before access is permitted.

Overview of Authentication Platform

Figure 3:
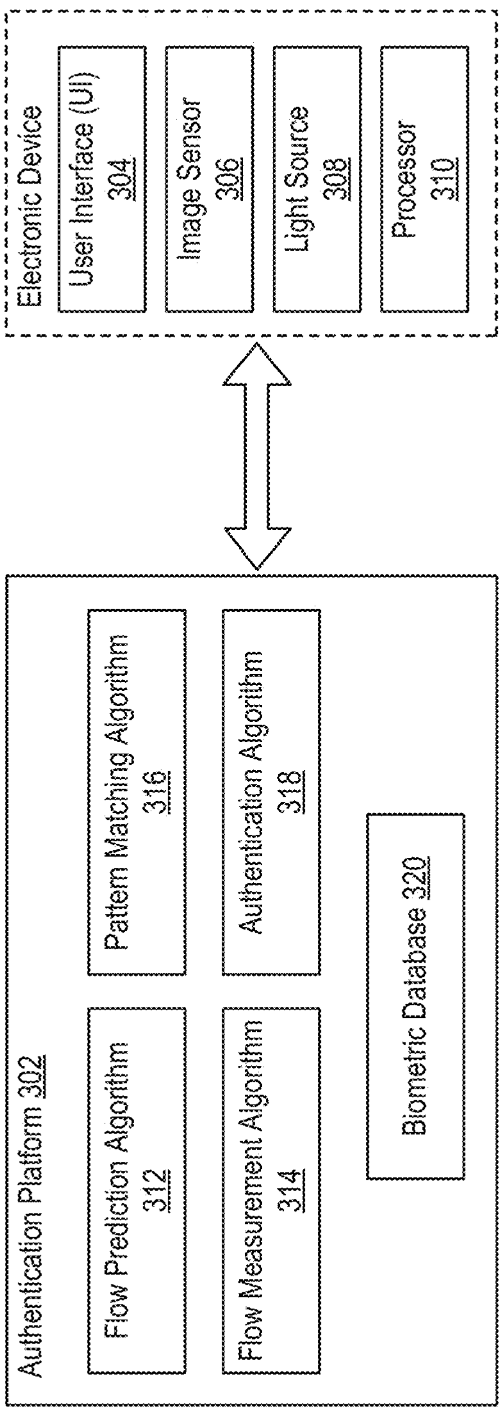
FIG. 3 includes a high-level representation of a system that can be used to authenticate the identity of an unknown person whose vasculature is available for imaging.

FIG. 3 includes a high-level representation of a system 300 that can be used to authenticate the identity of an unknown person whose vasculature is available for imaging. As shown in FIG. 3, the system 300 includes an authentication platform 302 that may have access to a user interface (UI) 304, image sensor 306, light source 308, processor 310, or any combination thereof. As further discussed below, these elements of the system 300 can be embedded in the same electronic device or distributed amongst multiple electronic devices. For example, the authentication platform 302 may reside, partially or entirely, on a network-accessible server system while the UI 304, image sensor 306, light source 308, and processor 310 may reside on another electronic device that is responsible for generating digital images of the unknown person.

The UI 304 is representative of the interface through which the unknown person is able to interact with the system 300. The UI 304 could be a speech-driven graphical user interface (GUI) shown on the display of an electronic device. Alternatively, the UI 304 could be a non-speech-driven GUI shown on the display of an electronic device. In such embodiments, the UI 304 may visually indicate a body part to be presented for authentication purposes. For instance, the UI 304 may visually prompt the unknown person to position her body such that an anatomical region can be observed by the image sensor 306. As an example, the UI 304 may include a "live view" of digital images generated by the image sensor 306 so that the unknown person is able to readily align her face with the image sensor 306. As another example, the UI 304 may present an illustration to indicate where the unknown person should place her hand so that the palmar or dorsal side of the hand can be imaged using the image sensor 306. Moreover, the UI 304 may present authentication decisions that are ultimately made by the authentication platform 302.

The image sensor 306 may be any electronic sensor that is able to detect and convey information in order to generate digital images. Examples of image sensors include charge-coupled device (CCD) sensors and complementary metal-oxide semiconductor (CMOS) sensors. The image sensor 306 may be implemented in a camera module (or simply "camera"). In some embodiments, the image sensor 306 is one of multiple image sensors implemented in an electronic device. For example, the image sensor 306 could be included in a front- or rear-facing camera built into a mobile phone.

Normally, digital images are generated by the image sensor 306 in conjunction with ordinary visible light. However, the image data that is representative of the digital images could be in various formats, color spaces, etc. For example, the image sensor 306 may be implemented in a camera that is designed to output image data in accordance with the red-green-blue (RGB) color model so that each pixel is assigned separate chromaticity values for red, green, and blue. As another example, the image sensor 306 may be implemented in a camera that is designed to output image data in accordance with one of the YCbCr color spaces so that each pixel is assigned a single value for luminance component (Y) and a pair of values for the chroma components (Cb, Cr).

The light source 308 includes one or more illuminants that are capable of emitting light in the visible range or non-visible range. For example, the light source 308 may include an illuminant that is able to emit white light while digital images are generated by the image sensor 306. Additionally or alternatively, the light source 308 may include an illuminant that is able to emit ultraviolet light or infrared light. Examples of illuminants include light-emitting diodes (LEDs), organic LEDs (OLEDs), resonant-cavity LEDs (RCLEDs), quantum dots (QDs), lasers such as vertical-cavity surface-emitting lasers (VCSELs), superluminescent diodes (SLEDs), and various phosphors.

Those skilled in the art will recognize that if the image sensor 306 is instructed (e.g., by the processor 310) to generate digital images in conjunction with light—whether visible or non-visible—emitted by the light source 308, the image sensor 306 must be designed to detect electromagnetic radiation in the appropriate range. In addition to CCDs and CMOSs, other examples of image sensors include monolithically-integrated germanium (Ge) photodiodes, indium-gallium-arsenide (InGaAs) photodiodes, mercury-cadmium-telluride (HgCdTe) photodiodes, and other photodetectors (e.g., photodiodes) designed for the infrared and ultraviolet regions of the electromagnetic spectrum.

Accordingly, the image sensor 306 and light source 308 may operate together to generate digital images of an anatomical regions under certain lighting conditions. For example, the image sensor 306 may generate a series of digital images while the light source 308 emits light in the visible range. As another example, the image sensor 306 may generate at least one digital image while the light source 308 emits light in the visible range and at least one digital image while the light source 308 emits light in the non-visible range.

As noted above, the image sensor 306 and light source 308 may be embedded in a single electronic device. In some embodiments, the electronic device is associated with the unknown person. For example, the image sensor 306 and light source 308 may be embedded in a mobile phone that is associated with the unknown person. In other embodiments, the electronic device is not associated with the unknown person. For example, the image sensor 306 and light source 308 may be embedded in a POS system through which the unknown person is attempting to complete a transaction.

This electronic device may be referred to as a "vascular monitoring apparatus" since it is responsible for monitoring changes in the vasculature within an anatomical region of interest. Over the course of the imaging portion of an authentication session, the vascular monitoring apparatus can collect image data pertaining to the anatomical region. As further discussed below, the authentication platform 302 may be able to identify pulse waves by examining the image data. The term "pulse wave" may refer to a change in color along the surface of the anatomical region that is caused by the movement of blood through the underlying subcutaneous tissue. While changes in color may be difficult, if not impossible, to discover with the human eye, the authentication platform 302 may be able to identify these changes through analysis of the image data. Since pulse waves are related to cardiac cycles, information regarding the vasculature in the anatomical region (and cardiovascular system as a whole) can be gleaned from the pulse waves.

As shown in FIG. 3, the authentication platform 302 may include a flow prediction algorithm 312, a flow measurement algorithm 314, a pattern matching algorithm 316, an authentication algorithm 318, and a biometric database 320. The biometric database 320 may store biometric data that is representative of gathered information related to vascular properties that can be used to identify known persons. The biometric data in the biometric database 320 may vary depending on the approach to authentication employed by the system 300. The biometric data in the biometric database 320 may be encrypted, hashed, or otherwise obfuscated to prevent unauthorized access.

For example, the biometric database 320 may include digital profiles for various individuals, and each digital profile may include a vein map for the corresponding individual that can be used for authentication. Each vein map may be comprised of, or constructed from, two- or three-dimensional image data of the corresponding anatomical region. Assume, for example, that the authentication platform 302 is programmed to determine whether to authenticate an unknown person as a given individual based on deformation of the vasculature in an anatomical region. In such a scenario, the authentication platform 302 can prompt the unknown person to perform a gesture and then establish deformation of the vasculature in the anatomical region through analysis of image data generated by the image sensor 306. Then, the authentication platform 302 can compare the deformation to a venous model that is associated with the given individual. At a high level, the venous model may programmatically indicate how the vasculature of the given individual deformed while the gesture was performed. Said another way, the venous model may be representative of a series of discrete positions indicating how the shape of a single vessel or collection of vessels changed over time as a gesture was performed, thereby causing deformation of the surrounding subcutaneous tissue.

This venous model can be created in several different ways. In some embodiments, the given individual is prompted to perform the gesture while being imaged during a registration phase, and the venous model is created based on analysis of the resulting digital images. In other embodiments, the anatomical region of the given individual is imaged so that a vein map can be produced by the authentication platform 302. In such embodiments, the authentication platform 302 may simulate deformation of the vasculature while performing the gesture based on the vein map.

A digital profile could include a single venous model associated with a single gesture, multiple venous models associated with a single gesture, or multiple models associated with different gestures. Similarly, a digital profile could include a single venous model associated with a single anatomical region, multiple venous models associated with a single anatomical region, or multiple models associated with different anatomical regions. During the registration phase, individuals may be permitted to specify which anatomical region(s) and gesture(s) can be used for authentication. While the authentication platform 302 may require that at least one venous model is created for each anatomical region and gesture pairing, individuals may be allowed to create multiple venous models (e.g., for improved robustness).

Additionally or alternatively, the digital profiles may include reference values for different vascular properties (e.g., the velocity of blood determined to be flowing through vessels in a given anatomical region) that can be used for authentication. Thus, the biometric database 320 may include data indicating the temporal variation in a vascular property for a single vessel or collection of vessels as a gesture is performed. Authentication could be based on similarity between values for vascular properties, such as pressure and flow rate, instead of, or in addition to, similarity between spatial deformation of the vasculature.

As noted above, the biometric database 320 may include one or more biometric signatures. The nature of each biometric signature may depend on how authentication is to be performed. For example, each biometric signature could be representative of a venous model created for an individual during a registration phase. Alternatively, each biometric signature may be representative of one or more values that indicate the temporal variation in a vascular property as deformation of the subcutaneous tissue in an anatomical region occurs. As an example, a biometric signature may comprise a vector of length N, where each element is a value that specifies the rate at which blood is flowing through the vasculature of an anatomical region as a gesture is performed. N may represent the number of samples taken over as the gesture is performed. Said another way, N may represent the number of digital images that are generated of the anatomical region as the gesture is performed, since the flow rate can be independently estimated for each digital image.

The biometric signatures in the biometric database 320 may be associated with a single individual, in which case the authentication platform 302 may be limited to authenticating an unknown person as that individual. Alternatively, these biometric signatures may be associated with multiple individuals, in which case the authentication platform 302 may be able to authenticate an unknown person as any of those individuals. Moreover, a single individual may have multiple biometric signatures in the biometric database 320 as mentioned above. These biometric signatures may correspond to different types (e.g., venous models versus values for vascular properties), different anatomical regions, or different gestures. For example, an individual may opt to create multiple biometric signatures for different anatomical regions during the registration phase, and there may be a different biometric signature for each anatomic region. As another example, an individual may opt to create multiple biometric signatures for different gestures during the registration phase, and there may be a different biometric signature for each gesture.

When executed by the processor 310, the algorithms implemented in the authentication platform 302 allow an individual to generate a biometric signature during a registration phase. Thereafter, the algorithms implemented in the authentication platform 302 allow verification to occur during a usage phase. The registration and usage phases are further described below.

The flow prediction algorithm 312 may be responsible for determining the relative timing of a pulse wave in an anatomical region through analysis of one or more digital images of the anatomical region. For instance, the flow prediction algorithm 312 may determine, based on the digital images, the timing or phase of the pulse wave at certain spatial coordinates (e.g., specifying the anatomical region) with or without physical deformation. When determined without physical deformation, this measurement may be referred to as the "measured venous flow pattern" or "measured flow pattern," while this measurement may be referred to as the "measured deformed venous flow pattern" or "measured deformed flow pattern" when determined with physical deformation. As an example, the relative timing of arrival of the pulse wave may be estimated based on recognition of a feature of the pulse wave, such as the dicrotic notch. Based on this information, the flow prediction algorithm 312 can estimate the rate at which blood is flowing through the vasculature in the anatomical region. Alternatively, the flow prediction algorithm 312 may estimate another vascular property, such as phase of the pressure pulse, direction of blood flow, volume of blood flow, or pressure of the vasculature in the anatomical region.

The flow measurement algorithm 314 may be responsible for predicting the propagation pattern of the pulse wave that will occur in an anatomical region when deformed. This propagation pattern may be referred to as the "predicted deformed venous flow pattern" or "predicted deformed flow pattern." To accomplish this, the flow measurement algorithm 314 may create a PPG by modeling, estimating, or otherwise predicting how the pulse wave will propagate through the anatomical region in a deformed state. The flow measurement algorithm 314 may obtain, as input, the measured flow pattern, vein map, and deformed vein map. As mentioned above, the deformed vein map may be determined based on at least one digital image of the anatomical region in the deformed state, or the deformed vein map may be determined by altering the vein map to simulate deformation.

In some embodiments, the flow measurement algorithm 314 is a machine learning algorithm. For example, the flow measurement algorithm 314 may be based on a neural network with parameters that are predetermined based on best practice examples or tuned through experimentation.

The predicted deformed flow pattern may be expressed using two- or three-dimensional coordinates relating to the surface of the anatomical region. Moreover, the predicted deformed flow pattern may be associated with (i) timing information and (ii) phase information. The timing information may relate to the relative time at which a pressure pulse may arrive at the coordinates after arriving in the anatomical region. The timing information may, for example, correspond to an identifiable feature of the pressure pulse, such as the dicrotic notch or another part of the pulse wave that is representative of the pressure pulse. The phase information may relate to the relative phase of the pressure pulse that may be present at every coordinate at a single point in time. Each coordinate in the anatomical region may have different pulse waveforms due to the different influences on the pressure pulse across the anatomical region.

The pattern matching algorithm 316 may be responsible for calculating the strength of a match between the predicted deformed flow pattern and measured deformed flow pattern. Said another way, the pattern matching algorithm 316 may be responsible for establishing the degree of similarity between the predicted deformed flow pattern and measured deformed flow pattern. The degree of similarity may be expressed using a metric that is referred to as the "match score." The match score may be expressed using any suitable numeric scale. For example, the match score may indicate degree of similarity using an arbitrary integer value between 0 and 100 or an arbitrary decimal value between 0 and 1.

The authentication algorithm 318 may be responsible for determining whether to authenticate the unknown person as the given individual based on the match score. For example, the authentication algorithm 318 may be programmed to authenticate the unknown person as the given individual if the match score exceeds a predetermined threshold. If the match score does not exceed the predetermined threshold, then the authentication algorithm 318 may not authenticate the unknown person as the given individual. Normally, the authentication algorithm 318 is designed to output a binary signal (e.g., a pass or fail) that indicates whether authentication is appropriate. However, the authentication algorithm 318 could be designed to output a non-binary signal. As an example, the output produced by the authentication algorithm 318 may indicate (i) that the unknown person should be authenticated as the given person, (ii) that the unknown person should not be authenticated as the given person, or (iii) that further attempts at authentication are needed. If the authentication algorithm 318 cannot establish whether authentication is appropriate with certainty, the authentication platform 302 may take further action (e.g., by prompting the unknown person to perform another gesture or present another anatomical region for imaging).

Figure 4:
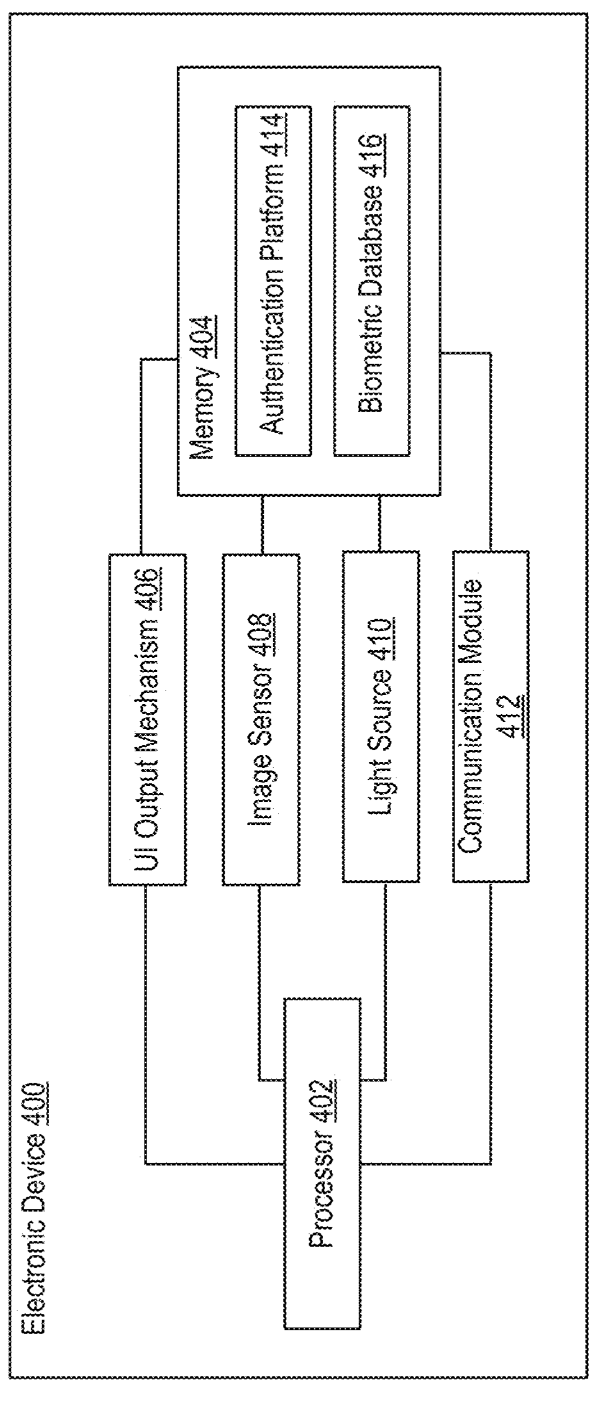
FIG. 4 illustrates an example of an electronic device able to implement an authentication platform that is designed to authenticate the identity of an unknown person based on image data that is generated by an image sensor.

FIG. 4 illustrates an example of an electronic device 400 able to implement an authentication platform 414 that is designed to authenticate the identity of an unknown person based on image data that is generated by an image sensor 408. As discussed above, the image data may be representative of one or more digital images of an anatomical region of the body. In some embodiments, those digital image(s) are generated based on ambient light that is reflected toward the image sensor 408 by the anatomical region. In other embodiments, a light source 410 emits light toward the anatomical region so as to illuminate the anatomical region while those digital image(s) are generated by the image sensor 408. Note that the light source 410 could also be configured to emit a discrete series of "pulses" or "flashes" of light over an interval of time.

In some embodiments, the authentication platform 414 is embodied as a computer program that is executed by the electronic device 400. For example, the authentication platform 414 may reside on a mobile phone that is able to obtain the image data from which a determination can be made whether authentication is appropriate. As another example, the authentication platform 414 may reside on a POS system that is able to obtain the image data from which the determination can be made. In other embodiments, the authentication platform 414 is embodied as a computer program that is executed by another electronic device to which the electronic device 400 is communicatively connected. In such embodiments, the electronic device 414 may transmit the image data to the other electronic device for processing. For example, while authentication of an unknown person may be sought by a POS system used to initiate a transaction, the image data may be generated by a mobile phone located proximate to the unknown person. The image data could be provided to the POS system or another electronic device (e.g., a computer server) for processing, or the image data could be processed by the mobile phone prior to delivery to the POS system or other electronic device. Those skilled in the art will recognize that aspects of the authentication platform 414 could also be distributed amongst multiple electronic devices.

The electronic device 414 can include a processor 402, memory 404, UI output mechanism 406, image sensor 408, light source 410, and communication module 412. The communication module 412 may be, for example, wireless communication circuitry designed to establish communication channels with other electronic devices. Examples of wireless communication circuitry include integrated circuits (also referred to as "chips") configured for Bluetooth, Wi-Fi, NFC, and the like. The processor 402 can have generic characteristics similar to general-purpose processors, or the processor 402 may be an application-specific integrated circuit (ASIC) that provides control functions to the electronic device 400. As shown in FIG. 4, the processor 402 can be coupled to all components of the electronic device 400, either directly or indirectly, for communication purposes.

The memory 404 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 402, the memory 404 can also store image data generated by the image sensor 408 and data generated by the processor 402 (e.g., when executing the modules of the authentication platform 414). Note that the memory 404 is merely an abstract representation of a storage environment. The memory 404 could be comprised of actual memory chips or modules.

As discussed above, the light source 410 may be configured to emit light (and more specifically, electromagnetic radiation) in the visible or non-visible range toward an anatomical region of the body of an unknown person to be authenticated. Normally, the light source 410 emits light only when instructed to do so. For example, if the authentication platform 414 determines that authentication is necessary, the authentication platform 414 may generate an output that prompts the processor 402 to (i) instruct the light source 410 to emit light and (ii) instruct the image sensor 408 to generate image data.

The communication module 412 can manage communications between the components of the electronic device 400. The communication module 412 can also manage communications with other electronic devices. Examples of electronic devices include mobile phones, tablet computers, personal computers, wearable devices, POS systems, and network-accessible server systems comprised of one or more computer servers. For example, in embodiments where the electronic device 400 is a mobile phone, the communication module 412 may facilitate communication with a network-accessible server system that is responsible for examining image data generated by the image sensor 408.

For convenience, the authentication platform 414 may be referred to as a computer program that resides in the memory 404. However, the authentication platform 414 could be comprised of software, firmware, or hardware components implemented in, or accessible to, the electronic device 400. In accordance with embodiments described herein, the authentication platform 414 may include various algorithms as discussed above with reference to FIG. 3. Normally, these algorithms are executed by separate modules of the authentication platform 414 that are separately addressable (and thus can execute independently without disturbing the other modules). These modules can be an integral part of the authentication platform 414. Alternatively, these modules can be logically separate from the authentication platform 414 but operate "alongside" it. Together, these algorithms may enable the authentication platform 414 to authenticate the identity of an unknown person based on an analysis of vascular dynamics as determined from image data generated by the image sensor 408.

Assume, for example, that an unknown person wishes to authenticate herself as a given individual. In such a scenario, the unknown person may be prompted to perform a gesture that causes deformation of the vasculature in an anatomical region. While the unknown person performs the gesture, the image sensor 408 can generate image data that is representative of digital images of the anatomical region. Based on an analysis of the image data, the authentication platform 414 may generate a "biometric signature" for the unknown perform. For example, the authentication platform 414 may produce a venous model that programmatically indicates how the vasculature deformed while the gesture was performed, or the authentication platform 414 may estimate a metric for a vascular property based on an analysis of the image data.

The authentication platform 414 can then compare the biometric signature against a registered biometric signature that is associated with the given individual in order to determine whether the unknown person should be authenticated as the given individual. Normally, the registered biometric signature is stored in a biometric database 416. In FIG. 4, the biometric database 416 is located in the memory 404 of the electronic device 400. However, the biometric database 416 could alternatively or additionally be located in a remote memory that is accessible to the electronic device 400 via a network. If the biometric signature is sufficiently similar to the registered biometric signature, then the authentication platform 414 may authenticate the unknown person as the given individual.

Other elements could also be included as part of the authentication platform 414. For example, a UI module may be responsible for generating the content to be output by the UI output mechanism 406 for presentation to the unknown person. The form of the content may depend on the nature of the UI output mechanism 406. For example, if the UI output mechanism 406 is a speaker, then the content may include an audible instruction to locate the electronic device 400 so that an anatomical region is observable by the image sensor 408. As another example, if the UI output mechanism 406 is a display, then the content may include a visual instruction to locate the electronic device 400 so that an anatomical region is observable by the image sensor 408. The UI output mechanism 406 may also be responsible for outputting (e.g., emitting or displaying) authentication decisions made by the authentication platform 414.

Vascular Deformation Caused by Performance of Gestures

Figure 5:
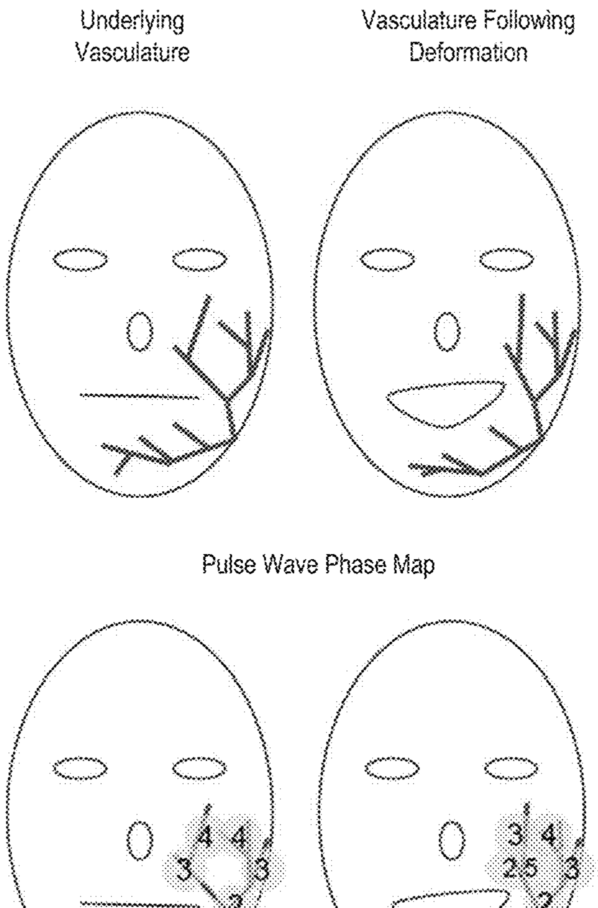
FIG. 5 illustrates how the underlying vasculature in an anatomical region (here, the face) may be altered due to performance of a gesture that causes physical deformation of the surrounding tissue.

Within a given anatomical region, the vessels underneath the skin define the vasculature. As an example, the face includes several anatomical regions (e.g., the forehead, cheeks, and chin) in which the vasculature can be visually monitored. FIG. 5 illustrates how the underlying vasculature in an anatomical region (here, the face) may be altered due to performance of a gesture that causes physical deformation of the surrounding tissue. FIG. 5 also illustrates how the blood flowing through the vasculature can monitored in terms of pulse waves. Said another way, movement of the blood within the vasculature can be visually monitored as it flows toward the arteriolar ends of capillaries in the anatomical region. In FIG. 5, arbitrary units numbered 1-4 are used to show an example order of pulse wave arrival.

As discussed above, the measured flow pattern may change due to (i) physical movement of vessels that alters the position of those vessels and (ii) deformation of surrounding tissues that alters the hemodynamic flow properties of the vasculature of interest. For example, compression of the tissue may cause the capillary pressure to increase, thereby changing the relative pulse phase and pulse wave velocity. Normally, the vasculature will deform in a predictable way whenever a gesture is repeatedly performed. If (i) the gesture, (ii) the undeformed vascular pattern (e.g., the top-left image in FIG. 5), and (iii) the measured flow pattern (e.g., the bottom-left image in FIG. 5) are known, the measured deformed flow pattern (e.g., the bottom-right image in FIG. 5) and/or the deformed vascular pattern (e.g., the top-right image in FIG. 5) can be determined. This process is further discussed below with reference to step 904 of FIG. 9.

Establishing Flow Patterns Through Analysis of Pulse Waves

Figure 6A:
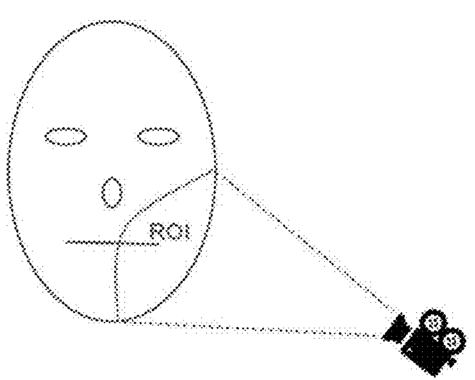
FIGS. 6A-C depict several different approaches to determining, computing, or otherwise obtaining pulse waves.
Figure 6B:
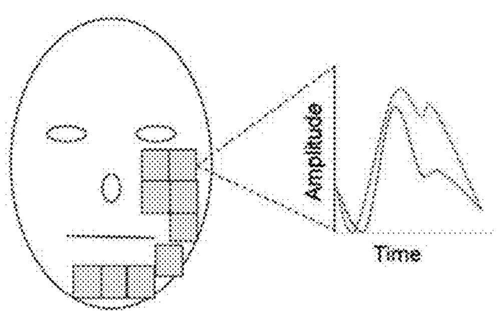
Figure 6C:
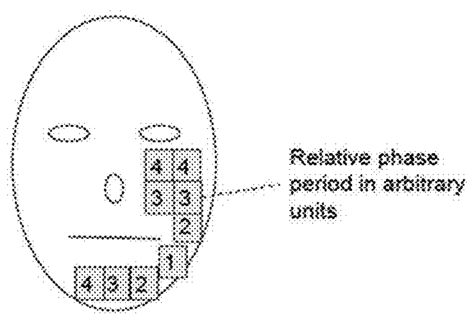

An important aspect to several approaches described herein is establishing the flow pattern of blood through the vasculature in a given anatomical region through analysis of image data. FIGS. 6A-C depict several different approaches to determining, computing, or otherwise obtaining pulse waves. FIG. 6A illustrates an approach in which object recognition is used to define a region of interest (ROI) of which digital images are generated. As shown in FIG. 6B, red and green pixel values may be extracted for the ROI over a period of at least one cycle. This can be done for multiple patches within the ROI, where the pixel values are averaged across each patch. Patches may have a fixed size and be distributed in the ROI in accordance with a segmentation function. Alternatively, the patches may have a size that can be adjusted (e.g., based on the size of the ROI, or based on the amount of computational resources available). The average pixel values from each patch can then be used to estimate pulse wave values that can be used to establish the phase of the pulse wave. As shown in FIG. 6C, these pulse wave values may indicate the relative phase period in arbitrary units.

Note that as the red and green pixel values relate to changes occurring at different depths (e.g., different vascular structures), the components may be differentially affected by physical deformation. This difference may be a useful component that the algorithms described herein can be trained to detect and then use to create predictions. Accordingly, it may be beneficial to ensure the red and green pixel values are not only made available to the authentication platform, but can also be used independently to calculate predictions and estimations of phase.

Methodologies for Authentication

Figure 7:
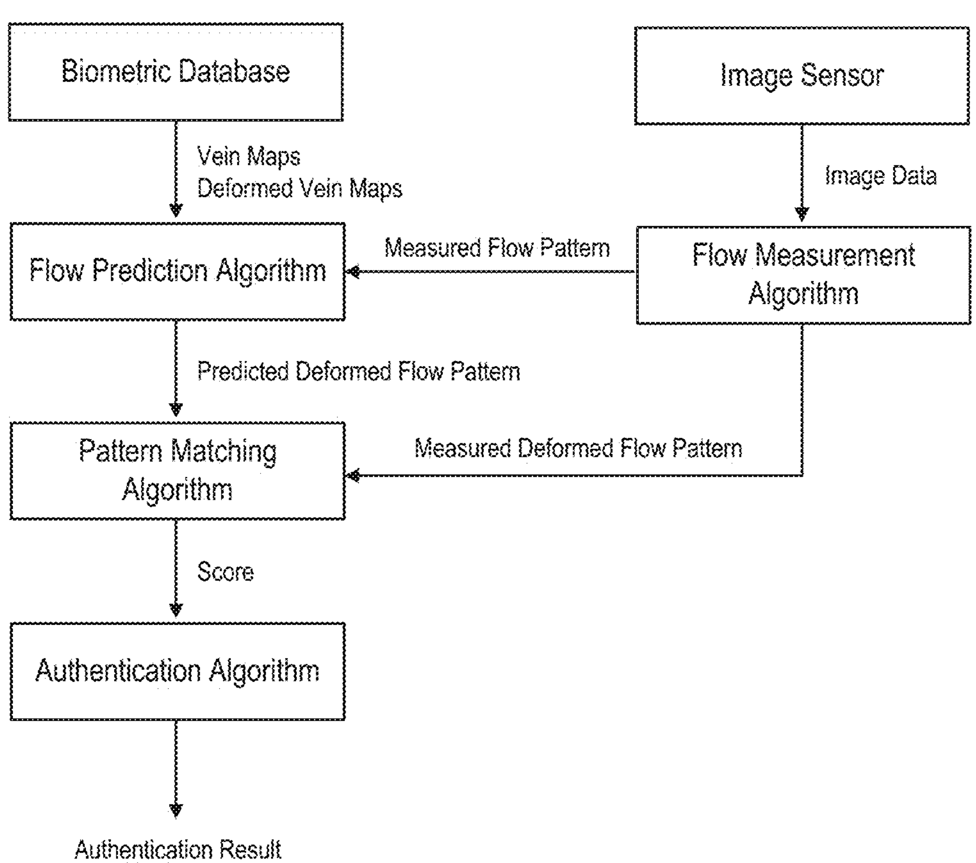
FIG. 7 includes a flow diagram of a procedure for authenticating a user of an authentication platform based on analysis of visual evidence of the vascular dynamics in an anatomical region.

FIG. 7 includes a flow diagram of a procedure 700 for authenticating a user of an authentication platform based on analysis of visual evidence of the vascular dynamics in an anatomical region. As further discussed below, the authentication procedure has three phases, a training phase, a registration phase, and a usage phase. These phases may be designed to allow for minimally disruptive authentication without requiring that the user interact with an electronic device in an unusual manner. Instead, the user may simply perform gestures while the electronic device generates digital images of an anatomical region that is deformed due to performance of those gestures.

For the purpose of illustration, the authentication procedure may be described in the context of monitoring the vasculature while the surrounding subcutaneous tissue is deformed due to performance of a gesture. However, the surrounding subcutaneous tissue could be deformed in other ways. For example, if the vasculature to be monitored is located in the finger, then the user may be prompted to locate the finger adjacent to the electronic device, so that haptic feedback that is generated by a haptic actuator (or simply "actuator") located inside the electronic device can deform the surrounding subcutaneous tissue.

To begin the training phase, the flow prediction algorithm may undergo supervised, semi-supervised, or unsupervised learning, where training data is retrieved, created, or otherwise obtained and then provided to the flow prediction algorithm for training purposes. The training data may include measured flow patterns and/or measured deformed flow patterns in association with corresponding vein maps and/or deformed vein maps. Normally, the training data is associated with a single anatomical region since an understanding of deformation in one anatomical region (e.g., the face) may simply not be applicable to another anatomical region (e.g., the hand). However, the training data may be associated with multiple individuals. Thus, for various individuals, the training data may include measured flow patterns, measured deformed flow patterns, vein maps, deformed vein maps, or any combination thereof.

In some embodiments, learning with gestures is accomplished via transfer learning based on a model that is learned during normal time (e.g., a state with no gesture—also referred to as a "normal state"). For example, each layer of a neural network may be divided into (i) a first layer related to the features of the corresponding individual that is not dependent on gestures and (ii) a second layer related to the features of the corresponding individual that is changed by gestures. A reduction of image data for learning (and reduction of the learning process) can be expected by fixing the first layer while only learning the second layer for each gesture of interest.

As mentioned above, a portion of the training data (e.g., the vein maps and deformed vein maps) may be image data. In some embodiments, the image data is generated from various capture angles or positions, or generated with various image sensors (e.g., corresponding to different electronic devices) to provide greater robustness to these changes in the usage phase.

Moreover, the training data may be split into a training set and a test set, for example, with 80 percent of the training data allocated to the training set and 20 percent of the training data allocated to the test set. Those skilled in the art will recognize that these values are provided for the purpose of illustration. More or less than 80 percent of the training data could be allocated to the training set. Similarly, more or less than 20 percent of the training data could be allocated to the test set. The share of training data that is allocated the training set is normally greater (e.g., by a factor of 2, 3, 5, etc.) than the share of training data that is allocated to the test set. While the training set may be used to train the flow prediction algorithm as discussed below, the test set may be used to confirm that the flow prediction algorithm properly learned how to predict flow.

At a high level, the flow prediction algorithm comprises a set of algorithms that are designed to produce an output (also referred to as a "prediction") that is related to the flow of blood through the vasculature of an anatomical region given certain inputs. These inputs may include vein maps, deformed vein maps, or image data of the anatomical region. In some embodiments, this set of algorithms is representative of one or more neural networks. Neural networks learn by processing examples, each of which is associated with known inputs and outputs, to form probability-weighted associations between the inputs and outputs. These probability-weighted associations may be referred to as the "weights." During the training phase, randomly selected weights may initially be used by the neural network(s) of the flow prediction algorithm. As the flow prediction algorithm learns from the measured flow patterns, vein maps, and deformed vein maps, these weights can be adjusted. Accordingly, the flow prediction algorithm may tune these weights as it learns how to output predicted deformed flow patterns.

Each predicted deformed flow pattern output by the flow prediction algorithm may be scored based on its deviation from the corresponding measured deformed flow pattern that serves as the ground truth. Normally, this is done for each example included in the training set. More specifically, a pattern matching algorithm may calculate a score using a threshold value for timing or phase at each temporal coordinate (e.g., +/−3, 5, or 10 milliseconds). If the difference in timing between the measured deformed flow pattern and predicted deformed flow pattern exceeds the threshold value, then the temporal coordinate may be marked as a failure. The score may be calculated by the pattern matching algorithm based on the percentage of temporal coordinates that have been classified as failures. Moreover, the pattern matching algorithm may compare the score to a predetermined threshold, classifying each example in the training set as either a "pass" or "fail" depending on whether the corresponding score exceeds the predetermined threshold. The pattern matching algorithm can calculate the overall success rate of the flow prediction algorithm based on the percentage of passing examples in the training set.

Note that the weights of the neural network(s) of the flow prediction algorithm can be adjusted per any scheme in which adjustments are made to optimize success. One example of a known scheme is the Monte Carlo approach. Accordingly, this portion of the training phase may be repeated for a predetermined number of cycles, or this portion of the training phase may be repeated until the overall success rate reached an acceptable value (e.g., 90, 95, or 98 percent).

To ensure that the flow prediction algorithm is operating properly, the test set may be used. Thus, the flow prediction algorithm may be applied to the vein maps and deformed vein maps included in the test set in order to generate predicted flow patterns or predicted deformed flow patterns. As discussed above, the pattern matching algorithm may calculate a score that is indicative of performance of the flow prediction algorithm based on a comparison of the predicted flow patterns or predicted deformed flow patterns to the measured flow patterns or measured deformed flow patterns, respectively.

In the registration phase (also referred to as the "setup phase"), a vein map and deformed vein map may be generated for a user during normal use of an electronic device. For example, upon receiving input indicative of a request to initiate the registration phase, the electronic device may generate digital images of an anatomical region while the anatomical region deforms (e.g., due to performance of a gesture by the user). Deformation may be prompted via an UI by requesting (e.g., via text) that the user smile, frown, or purse her lips while digital images of the face are generated by the electronic device. For example, the UI may display a graphical representation of deformation by a generic model of the anatomical region or a human body so as to visually instruct the user. As another example, the UI may display a graphical representation of a gesture that will cause deformation of the anatomical region. For instance, the graphical representation may act as a visual instruction to interact with the electronic device that is responsible for generating the digital images in a certain manner (e.g., swiping a finger across the screen, holding the chassis in a certain way, etc.).

From these digital images, the vein map and deformed vein map for the anatomical region can be generated. As shown in FIG. 7, the vein map and deformed vein map are normally stored in a biometric database and then subsequently retrieved when an unknown person is attempting to authenticate herself as the user.

Figure 8:
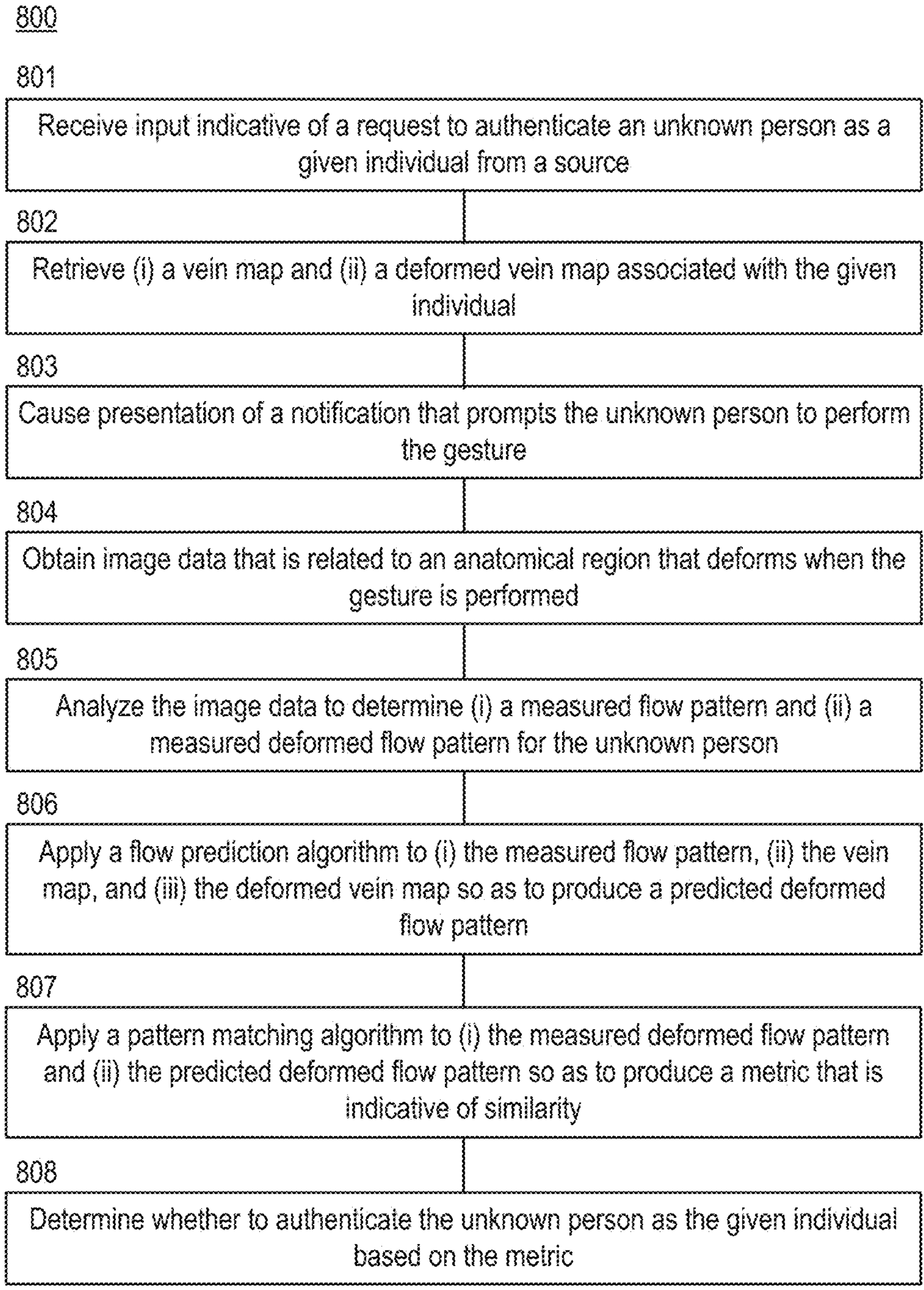
FIG. 8 includes a flow diagram of the process performed by the authentication platform during the usage phase (also referred to as the "implementation phase").

FIG. 8 includes a flow diagram of the process 800 performed by the authentication platform during the usage phase (also referred to as the "implementation phase"). Initially, the authentication platform will receive input indicative of a request to authenticate an unknown person as a given individual from a source (step 801). In some embodiments, the source is a computer program that is executing on the same electronic device as the authentication platform. For example, if the authentication platform resides on a mobile phone, the authentication request may originate from a mobile application through which the unknown person is attempting to perform an activity that requires authentication. In other embodiments, the source originates from another electronic device. Assume, for example, that the unknown person attempts to complete a transaction using a POS system associated with a merchant. In such a scenario, the POS system may require that authentication be performed. While the POS system may be responsible for generating the image data needed for authentication, the authentication platform may reside on a computer server that is communicatively connected to the POS system across a network.

The authentication platform can then receive (i) a vein map and (ii) a deformed vein map associated with the given individual (step 802). As discussed above, the deformed vein map may be associated with a gesture that was performed by the given individual during a registration phase. Moreover, the authentication platform may cause presentation of a notification that prompts the unknown person to perform the gesture (step 803). This notification is intended to prompt the unknown person to perform the same gesture as was performed by the given individual during the registration phase.

As discussed above, performing the gesture may result in deformation of an anatomical region of interest. As the unknown person performs the gesture, an electronic device may monitor deformation of the anatomical region. For example, an image sensor of the electronic device may generate image data through observation of the anatomical region, and the authentication platform may obtain this image data for analysis (step 804). In some embodiments, the image data comprises digital images that are generated before, during, or after deformation of the anatomical region. For example, the electronic device may generate a first series of digital images over a first interval of time before deformation occurs and a second series of digital images over a second interval of time while deformation is "held." Accordingly, the electronic device may generate digital images while the anatomical region is in its natural state (also referred to as the "relaxed" state) and deformed state. Normally, the first and second intervals of time are long enough that at least one entire cardiac pulse cycle can be observed. While the duration of a cardiac pulse cycle will vary depending on various physiological factors, it normally falls within the range of 0.5-2.0 seconds. Accordingly, the first and second intervals of time may be at least 1, 2, or 3 seconds. Longer durations may optionally be used to capture more than one cardiac pulse cycle.

The authentication platform can then analyze the image data to determine (i) the measured flow pattern and (ii) the measured deformed flow pattern (step 805). To accomplish this, the authentication platform may apply a flow measurement algorithm to the image data. When applied to the image data, the flow measurement algorithm may initially perform a registration operation (also referred to as a "mapping operation") to determine the pixel locations in the image data that correspond to certain anatomical coordinates in the vein map and the deformed vein map. This mapping operation ensures that the values in these datasets relate to the same locations in the anatomical region. Then, the flow measurement algorithm may average the red or green frequency component of the image data across various pixel regions (e.g., 3×3, 6×6, or 9×9 pixel regions). The frequency band that is selected may roughly correspond to frequency of the pressure pulse that carries blood to the anatomical region. Other frequencies may alternately be used if suitable, however. The average red or green frequency component can be computed for image data corresponding to different points in time such that a time series is created that specifies the intensity of the frequency band of interest. For example, the flow measurement algorithm may average the red or green frequency component of different digital images (e.g., that are representative of frames of a video generated by the electronic device). Further, the flow measurement algorithm may perform pattern recognition so as to determine the relative timing of a single identifiable phase of the pressure pulse, such as the dicrotic notch, based on an analysis of the time-varying series of average values for the red or green frequency component. After this phase of the pressure pulse has been identified, the flow measurement algorithm may assign timing values to some or all of the pixel regions relative to the earliest detected appearance of the identified phase of the pressure pulse. At a high level, these timing values may be representative of a flow pattern that indicates how blood flows through the vasculature of the anatomical region, as determined from analysis of the image data. If the image data is associated with the anatomical region in its natural state, then this flow pattern may be referred to as the "measured flow pattern." If the image data is associated with the anatomical region in its deformed state, then this flow pattern may be referred to as the "measured deformed flow pattern."

The authentication platform can then apply a flow prediction algorithm to (i) the measured flow pattern produced for the unknown person, (ii) the vein map for the given individual, and (iii) the deformed vein map for the given individual so as to produce a predicted deformed flow pattern (step 806). At a high level, the predicted deformed flow pattern may be a data structure containing timing values that represents a prediction as to how blood might flow through the vasculature of the given individual when the gesture is performed.

The authentication platform can then apply a pattern matching algorithm to (i) the measured deformed flow pattern and (ii) the predicted deformed flow pattern to produce a metric that is indicative of similarity (step 807). As discussed above, this metric may be referred to as the "match score." At a high level, this metric may indicate the degree to which the measured deformed flow pattern is comparable to the predicted deformed flow pattern on a per-value basis.

The authentication platform can then determine whether to authenticate the unknown person as the given individual based on the metric (step 808). For example, the authentication platform may apply an authentication algorithm that compares the metric to a predetermined threshold. If the metric exceeds the predetermined threshold, then the authentication algorithm may produce an output that indicates the unknown person should be authenticated as the given individual. However, if the metric does not exceed the predetermined threshold, then the authentication algorithm may produce an output that indicates the unknown person should not be authenticated as the given individual.

Figure 9:
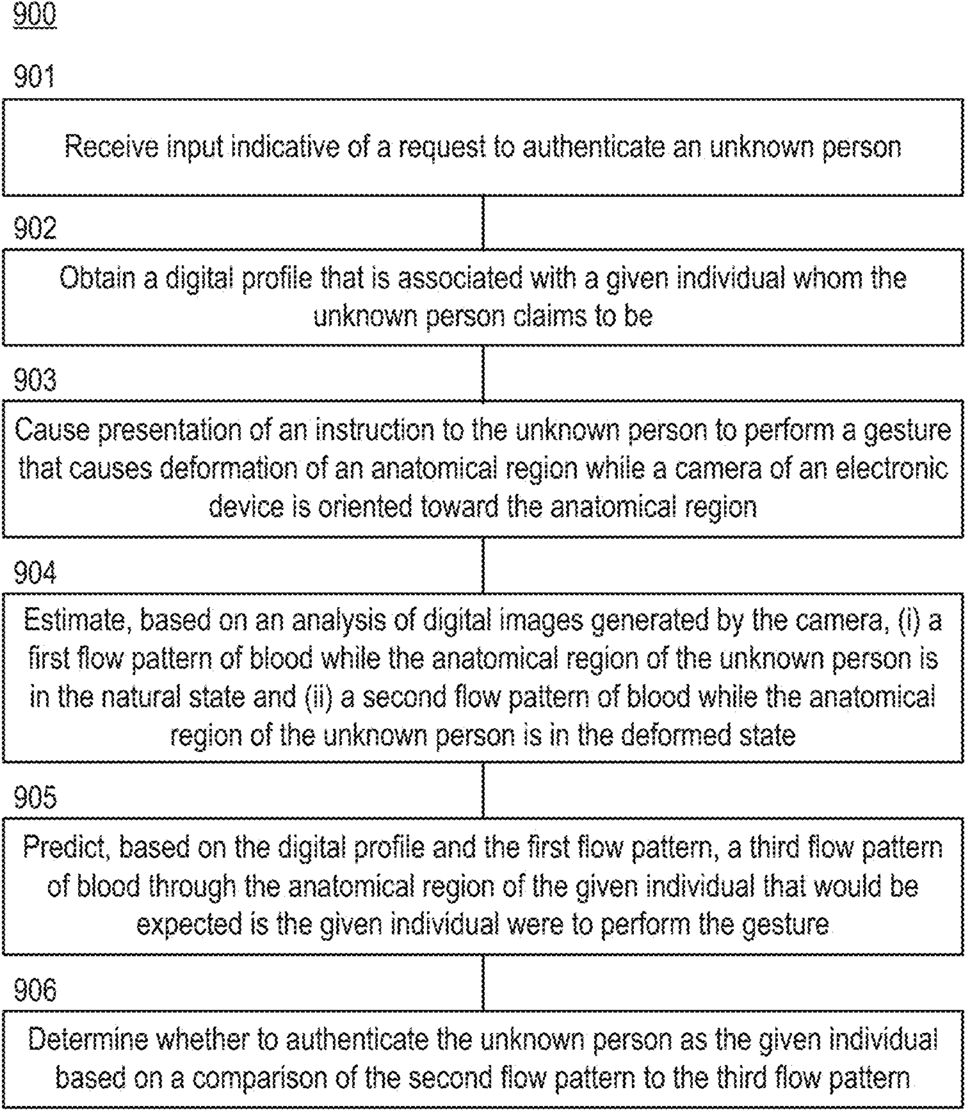
FIG. 9 includes a flow diagram of another process for determining whether to authenticate an unknown person as a given individual through vascular studies.

FIG. 9 includes a flow diagram of another process 900 for determining whether to authenticate an unknown person as a given individual through vascular studies. FIG. 10, meanwhile, includes a visual illustration of the process by which an authentication platform determines whether to authenticate an unknown person as a given individual. Initially, an authentication platform may receive input indicative of a request to authenticate an unknown person as a given individual (step 901). Step 901 of FIG. 9 may be substantially similar to step 801 of FIG. 8. For the purpose of illustration, the process 900 is described in the context of examining digital images generated by an electronic device that is in possession of the unknown person. However, those skilled in the art will recognize that the process 900 may be similarly applicable to scenarios where the unknown person is proximate to, but not in possession of, the electronic device (e.g., where the electronic device is a POS system).

Thereafter, the authentication platform can obtain a digital profile that is associated with the given individual whom the unknown person claims to be (step 902). For example, the authentication platform may access a biometric database in which digital profiles associated with different individuals are stored, and then the authentication platform may select the digital profile from amongst the digital profiles based on the input. Normally, the input identifies (e.g., using a name or identifier, such as an email address or phone number) the given individual whom the unknown person claims to be, so the authentication platform may simply identify the appropriate digital profile from amongst those stored in the biometric database.

The digital profile may include one or more vascular patterns (also referred to as "vein maps") that are associated with the given individual. In addition to being associated with the given individual, each vascular pattern may be associated with a given anatomical region. For example, the digital profile may include separate vascular patterns for the face, palm, finger, etc. Moreover, the digital profile may include vascular profiles for the same anatomical region in different states. For example, the digital profile may include (i) a first vascular pattern that provides spatial information regarding the vessels in an anatomical region while the anatomical region is in a natural state and (ii) a second vascular pattern that provides spatial information regarding the vessels in the anatomical region while the anatomical region is in a deformed state (e.g., due to performance of a gesture).

The authentication platform can then cause presentation of an instruction to the unknown person to perform a gesture that causes deformation of an anatomical region while the camera of the electronic device is oriented toward the anatomical region (step 903). As the unknown person performs the gesture, the camera may generate a series of digital images. These digital images may be generated discretely in rapid succession at a predetermined cadence (e.g., every 0.1, 0.2, or 0.5 seconds). Alternatively, the camera may generate a video of the anatomical region, in which case the digital images may be representative of the frames of the video. In this scenario, the digital images may be generated at a predetermined rate (e.g., 20, 30, or 60 frames per second).

Then, the authentication platform can estimate flow patterns for the unknown person based on the digital images that are generated by the camera. More specifically, the authentication platform can estimate, based on an analysis of the digital images, (i) a first flow pattern of blood while the anatomical region of the unknown person is in the natural state and (ii) a second flow pattern of blood while the anatomical region of the person is in the deformed state (step 904). As discussed above, these flow patterns will be estimated based on different digital images generated by the camera of the electronic device. The first flow pattern may be generated based on analysis of digital images of the anatomical region in its natural state (e.g., those generated before or after the gesture has been performed), and the second flow pattern may be generated based on analysis of digital images of the anatomical region in its deformed state (e.g., those generated while the gesture is performed or held). As discussed above with respect to FIG. 8, the first and second flow patterns may be estimated based on programmatic analysis of the pixels of the corresponding digital images so as to identify variations in color (e.g., in the red components or green components) that are indicative of the flow of blood through the vessels in the anatomical region.

Moreover, the authentication platform can predict, based on the digital profile and the first flow pattern, a third flow pattern of blood through the anatomical region of the given individual that would be expected if she were to perform the gesture (step 905). As mentioned above, the digital profile may include (i) a first vascular pattern that provides spatial information regarding the vessels in the anatomical region of the given individual while the anatomical region is in a natural state and (ii) a second vascular pattern that provides spatial information regarding the vessels in the anatomical region of the given individual while the anatomical region is in a deformed state. By applying an algorithm to the first vascular pattern, second vascular pattern, and the first flow pattern, the authentication platform may be able to generate, as output, the third flow pattern. At a high level, the algorithm may simulate blood flow through the vessels during deformation of the anatomical region that would be caused by the gesture.

The authentication platform can then determine whether to authenticate the unknown person as the given individual based on a comparison of the second flow pattern to the third flow pattern (step 906). Assume, for example, that the first flow pattern, second flow pattern, and third flow pattern are represented as matrices. The first flow pattern may be represented as a first vector or matrix, where each element includes a value that is indicative of estimated blood flow through a corresponding segment of the anatomical region of the unknown person while in the natural state. The second flow pattern may be represented as a second vector or matrix, where each element includes a value that is indicative of estimated blood flow through the corresponding segment of the anatomical region of the unknown person while in the deformed state. Meanwhile, the third flow pattern may be represented as a third vector or matrix, where each element includes a value that is indicative of estimated blood flow though the corresponding segment of the anatomical region of the given individual while in the deformed state. In such a scenario, the authentication platform may apply an algorithm to the second and third vectors or matrices to produce a score that is indicative of similarity between the second and third flow patterns. Then, the authentication platform can establish the likelihood that the unknown person is the given individual based on the score. Note that the term "matrix," as used herein, may be used to refer to a series of row vectors or columns vectors.

Other steps may also be included. As one example, the authentication platform may generate a signal (e.g., in the form of a message or notification) that indicates whether the unknown person has been authenticated as the given individual. The authentication platform may transmit this signal to the source from which the request to authenticate was received. If, for example, the request to authenticate the unknown person is received from a computer program executing on a mobile phone, then the authentication platform may provide the signal to the mobile phone so that the computer program is able to establish whether to permit the unknown person to perform whichever task required authentication. Similarly, if the request to authenticate the unknown person is received from a POS system in the midst of a transaction, then the authentication platform may provide the signal to the POS system so that the transaction can be completed.

As discussed above with reference to FIG. 8, performing authentication may require that the authentication platform apply a flow prediction algorithm to (i) a measured flow pattern associated with an unknown person, (ii) a vein map associated with a given individual, and (iii) a deformed vein map associated with the given individual to produce a predicted deformed flow pattern. This predicted deformed flow pattern is representative of a prediction by the authentication platform regarding how blood would flow through the vasculature if the given individual were to perform a certain gesture. In some embodiments, the flow prediction algorithm is part of a collection of algorithms that collectively define a flow prediction model. Generally, the flow prediction model is a machine learning (ML) or artificial intelligence (AI) model that is "trained" using examples to make predictions, namely, how blood will flow through the vasculature when deformed.

FIG. 11 includes a flow diagram of a process 1100 for creating a model that is trained to predict the flow of blood through the vasculature of an anatomical region when deformed. As mentioned above, the anatomical region could be deformed through performance of a gesture, or the anatomical region could be deformed through application of an external force (e.g., haptic feedback produced by a haptic actuator). The nature of the deformation may depend on the anatomical region. For example, the vasculature in the face may be easier to deform by instructing the person to perform a gesture (e.g., smile or frown), while the vasculature in the finger may be easier to deform by instructing the person to place her finger against an electronic device and then applying an external force (e.g., via haptic feedback).

Initially, the authentication platform can identify a model to be trained to predict blood flow through the venous network in an anatomical region when deformed (step 1101). Note that the terms "venous network" and "vasculature" may be used interchangeably. Thus, the term "venous network" may refer to the portion of the vascular system that is located in the anatomical region. While the anatomical region could be any portion of the body from which vascular dynamics can be monitored through imaging, common anatomical regions include the finger, the palmar and dorsal sides of the hand, and the face.

Then, the authentication platform can obtain (i) a first series of vascular patterns corresponding to the anatomical region in a natural state, (ii) a second series of vascular patterns corresponding to the anatomical region in a deformed state, (iii) a series of flow patterns that convey, for each vascular pattern in the first series, how blood flows through that vascular pattern when the anatomical region is in the natural state, and (iv) a series of deformed flow patterns that convey, for each vascular pattern in the second series, how blood flows through that vascular pattern when the anatomical region is in the deformed state (step 1102). Each vascular pattern in the first series may indicate the spatial relationships between subcutaneous vessels when the anatomical region is in the natural state. Meanwhile, each vascular pattern in the second series may indicate the spatial relationships between subcutaneous vessels when the anatomical region is in the deformed state.

Moreover, each vascular pattern in the first series may be associated with a corresponding vascular pattern in the second series, and the corresponding vascular patterns in the first and second series may be associated with the same individual. Accordingly, a single individual could be associated with a vascular pattern in the first series, a vascular pattern in the second series, one of the flow patterns, and one of the deformed flow patterns. Normally, each vascular pattern in the first series is associated with a different individual, though the same individual could be associated with multiple vascular patterns in the first series. For example, a single individual could be associated with vascular patterns that correspond to the same anatomical region but were generated using image data produced by different electronic devices. Similarly, each vascular pattern in the second series is normally associated with a different individual. However, as mentioned above, each vascular pattern in the first series may be associated with the same individual as a corresponding vascular pattern in the second series.

Then, the authentication platform can provide (i) the first series of vascular patterns, (ii) the second series of vascular patterns, (iii) the series of flow patterns, and (iv) the series of deformed flow patterns to the model as training data (step 1103). Such an approach causes the model to be trained to predict blood flow through the venous network in the anatomical region of a person when applied to a vascular pattern associated with the person. Said another way, the authentication platform may provide this information to the model as training data, so as to produce a trained model that is able to predict blood flow. For example, if the authentication platform is tasked with predicting the flow of blood through the anatomical region of a given individual, the authentication platform may apply the trained model to a pair of vascular patterns associated with the given individual. The pair of vascular patterns may include one vascular pattern that corresponds to the anatomical region in the natural state and another vascular pattern that corresponds to the anatomical region in the deformed state. After training is complete, the authentication platform may store the trained model in a biometric database (step 1104).

Additional Considerations and Implementations

A. Personalized Gestures

As discussed above, vein maps may play a key role in determining whether to authenticate an unknown person as a given individual. To tailor the authentication process, the authentication platform may design or select a deformation based on those vein maps.

Assume, for example, that an unknown person wishes to authenticate herself as a given individual. As part of the authentication process, the authentication platform may obtain vein maps that are associated with the given individual (e.g., a first vein map for an anatomical region in a natural state and a second vein map for the anatomical region in a deformed state). In this situation, the authentication platform may design or select a deformation that will better surface or highlight the unique aspects of these vein maps. For example, the authentication platform may analyze some or all of the vein maps included in a biometric database to identify features that are sufficiently unique. These features may pertain to the spatial relationships between different vessels (e.g., unusual branching locations or unusual dimensions), or these features may pertain to the vascular properties of vessels (e.g., if the speed, volume, or pressure of blood flowing through the venous network changes more or less than average following deformation).

Additionally or alternatively, the authentication platform may utilize a system to deliver a request to perform a gesture to an unknown person (or otherwise prompt, provoke, or cause deformation) in a manner that surfaces the unique features. For example, the authentication platform may ask the unknown person to apply pressure to a position along the palm to inhibit or occlude blood flow to the location of a unique vessel, thereby producing a unique effect on the venous resistance for other vessels that flow into that unique vessel. The effect of the deformation on the pressure pulse emanating through the anatomical region (and thus the image data that visually captures the pressure pulse) may be co-located with the deformation, or the effect may be somewhat distant from the location of the deformation.

As discussed above, the authentication platform may produce a measured flow pattern and a measured deformed flow pattern as part of the authentication process. In some embodiments, the authentication platform determines the differences between the measured flow pattern and measured deformed flow pattern and then compares those differences against other examples to ensure that the produced variation in the image data by the deformation is also sufficiently unique.

B. Measured Flow Pattern Matching

After the measured flow pattern and measured deformed flow pattern are known for an unknown person, the authentication platform may authenticate the unknown person based solely on the match of the measured flow pattern since the association with the original vein map authentication factor was previously established. This "lightweight" authentication process may only be suitable for some situations, such as those involving minimally sensitive information or actions. However, this "lightweight" authentication process can be useful for quickly authenticating unknown persons if, for example, time or computing resources are limited.

C. Multiple Deformations

As discussed above, a given individual may be prompted to perform multiple gestures during a registration phase.

Such an approach provides a notable security advantage since there are multiple options for authentication. If an unknown person seeks to be authenticated as the given individual, the authentication platform can request that the unknown person perform any combination of the gestures performed by the given individual during the registration phase. Thus, the authentication platform may request that an unknown person perform several different gestures during the authentication process, and the authentication platform may only authenticate the unknown person as a given individual if a predetermined percentage (e.g., more than 50 percent, exactly 100 percent) of those gestures result in a match with the given individual.

The authentication platform could also request that the unknown person perform the same gesture more than once. For example, the authentication platform may request that an unknown person perform a single gesture more than once during the authentication process, and the authentication platform may only authenticate the unknown person as a given individual if a predetermined percentage (e.g., more than 50 percent, exactly 100 percent) of those performances result in a match with the given individual.

In embodiments where the authentication platform allows individuals to perform multiple gestures during the registration phase, the authentication platform may manage separate biometric databases for those different gestures. For example, the authentication platform may manage a first biometric database that includes information (e.g., vein maps and deformed vein maps) for a first gesture, a second biometric database that includes information for a second gesture, etc. Alternatively, the authentication platform may store information associated with different gestures in different portions of a single biometric database.

Moreover, entries in the biometric database may not only be associated with a name or identifier (e.g., an email address or phone number) that identifies the corresponding individual, but also a label that identifies the corresponding gesture. Accordingly, different gestures (e.g., smiling and frowning) may be associated with different labels that can be appended to entries in the biometric database.

In some embodiments, the appropriate label is identified based on analysis of the image data that is used for authentication. For example, if the image data includes digital images of the face, the authentication platform may examine those digital images to determine which gesture has been performed. Automated analysis of the image data may be useful in several respect. First, the authentication platform may be able to infer which gesture was performed by the unknown person rather than explicitly instruct the unknown person to perform a gesture. Second, the authentication platform may able to establish the appropriate vein maps to retrieve from the biometric database. For example, if the authentication platform determines that the unknown person performed a given gesture in the digital images, then the authentication platform can retrieve vein maps that are associated with the given gesture from the biometric database.

Benefits of Authenticating Unknown Persons Through Ranged Vascular Studies

A. Changes Due to Aging and Environment

While it is understood that the shape of vessels generally does not change, vascular properties—such as flowrate—may be impacted by factors such as age, illness, and the like. Environmental factors, such as temperature and humidity, may also impact vascular properties. For example, vessels may constrict or contract due to cold temperatures. Blood flow can also by impacted by physiological factors (e.g., nervousness and stress) and physiological activities (e.g., exercise).

The authentication platform can be designed such that it is robust to these changes in vascular properties. One important aspect of the authentication platform is its focus on local spatial properties and directionality of the blood flow as a result of deformation. As such, the impact of the above-mentioned factors—which tend to affect the body as a whole—are normally either negligible or manageable (e.g., through modeling). For example, in a nervous state and relaxed state, the directional pattern of blood flow through the venous network in an anatomical region due to performance of a gesture will be observable, though the absolute strength of the signal (e.g., as determined through analysis of image data) may differ.

Changes to the global blood flow may introduce some noise into individual measurements. However, the impact has been adequately addressed in recent research that has shown blood flow remains readily observable even after performing physical activities (e.g., exercise).

B. Robustness in Challenging Scenarios

Continued research has improved the accuracy and robustness of establishing or monitoring vascular dynamics through analysis of digital images. Interest in remote monitoring has also increased, especially in approaches that utilize electronic devices which are readily available, like mobile phones and tablet computers.

In a scenario where changes in the health of the unknown user influence spatial properties on a local scale (e.g., due to traumatic injury, stroke, etc.), the authentication platform may employ modelling techniques to account for these changes. For example, if the authentication platform detects that deformation has occurred based on analysis of image data related to an unknown person, then the authentication platform can apply an ML-based model that is designed to adjust the vein maps accordingly. Accordingly, the authentication platform may be able to intelligently manipulate vein maps to account for changes in the health of individuals after those individuals have completed the registration phase. As another example, if the authentication platform detects that the heart rate is high based on analysis of image data related to an unknown person, then the authentication platform can apply an ML-based model to determine an appropriate adjustment for a vascular property, such as flowrate or pressure. These types of adjustments are not expected to be widely needed, however, since spatial information and vascular properties tend to remain fairly consistent over time.

Processing System

Figure 12:
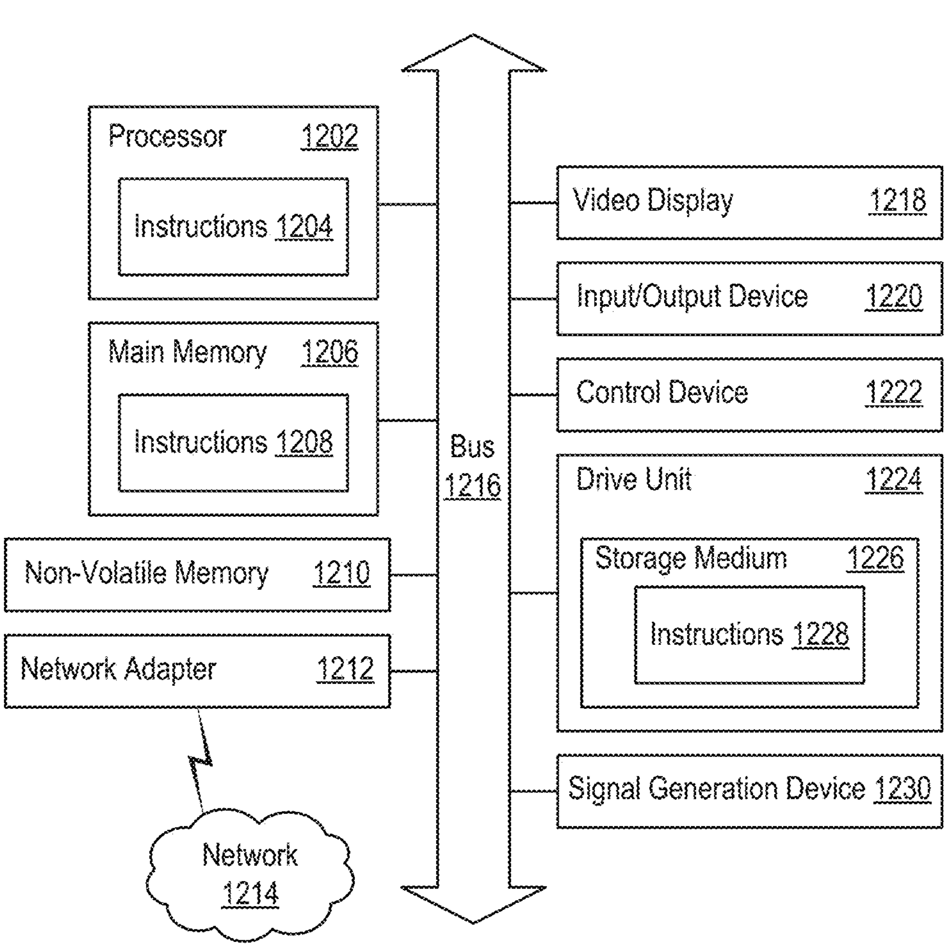
FIG. 12 is a block diagram illustrating an example of a processing system in which at least some operations described herein can be implemented.

FIG. 12 is a block diagram illustrating an example of a processing system 1200 in which at least some operations described herein can be implemented. For example, components of the processing system 1200 may be hosted on an electronic device that includes an image sensor. As another example, components of the processing system 1200 may be hosted on an electronic device that includes an authentication platform that is responsible for examining image data generated by the image sensor.

The processing system 1200 may include a processor 1202, main memory 1206, non-volatile memory 1210, network adapter 1212 (e.g., a network interface), video display 1218, input/output device 1220, control device 1222 (e.g., a keyboard, pointing device, or mechanical input such as a button), drive unit 1224 that includes a storage medium 1226, or signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or bus compliant with Institute of Electrical and Electronics Engineers (IEEE) Standard 1394.

The processing system 1200 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1200.

While the main memory 1206, non-volatile memory 1210, and storage medium 1224 are shown to be a single medium, the terms "storage medium" and "machine-readable medium" should be taken to include a single medium or multiple media that stores one or more sets of instructions 1226. The terms "storage medium" and "machine-readable medium" should also be taken to include any medium that is capable of storing, encoding, or carrying a set of instructions for execution by the processing system 1200.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memories and storage devices in a computing device. When read and executed by the processor 1202, the instructions cause the processing system 1200 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile memory devices, non-volatile memory devices 1210, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 1212 enables the processing system 1200 to mediate data in a network 1214 with an entity that is external to the processing system 1200 through any communication protocol supported by the processing system 1200 and the external entity. The network adapter 1212 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for producing a machine learning model that is able to predict blood flow through vasculature of an anatomical region, the method comprising:

receiving input that is indicative of a request to produce the machine learning model; and in response to said receiving, obtaining (i) a first vascular pattern that provides spatial information regarding one or more vessels in the anatomical region while the anatomical region is in an undeformed state, (ii) a second vascular pattern that provides spatial information regarding the one or more vessels while the anatomical region is in a deformed state, (iii) a first flow pattern that indicates, for the first vascular pattern, how blood flows through the one or more vessels when the anatomical region is in the undeformed state, and (iv) a second flow pattern that indicates, for the second vascular pattern, how blood flows through the one or more vessels when the anatomical region is in the deformed state;

providing the first vascular pattern, the second vascular pattern, the first flow pattern, and the second flow pattern to a machine learning algorithm that produces, as output, the machine learning model; and storing the machine learning model in a database.

2. The method of claim 1, wherein the first vascular pattern is one of a first plurality of vascular patterns, each of which provides spatial information regarding the one or more vessels while the anatomical region is in the undeformed state, wherein the second vascular pattern is one of a second plurality of vascular patterns, each of which provides spatial information regarding the one or more vessels while the anatomical region is in the deformed state.

3. The method of claim 2, wherein the first and second pluralities of vascular patterns are associated with an individual and acquired during a registration phase in which the individual is prompted to perform a plurality of instances of a gesture, and wherein each of the plurality of instances is associated with a corresponding one of the first plurality of vascular patterns and a corresponding one of the second plurality of vascular patterns.

4. The method of claim 2, wherein the first and second pluralities of vascular patterns are associated with a plurality of individuals, each of whom is associated with at least one of the first plurality of vascular patterns and at least one of the second plurality of vascular patterns.

5. The method of claim 1, wherein the anatomical region is a finger.

6. The method of claim 1, wherein the anatomical region is a palmar side or a dorsal side of a hand.

7. The method of claim 1, wherein the anatomical region is a face.

8. The method of claim 1, wherein the machine learning model is a neural network with weights that are tuned as the machine learning algorithm learns from the first vascular pattern, the second vascular pattern, the first flow pattern, and the second flow pattern.

* * * * *